(12) United States Patent  
Nomura

(10) Patent No.: US 7,672,579 B2  
(45) Date of Patent: Mar. 2, 2010

(54) RETRACTABLE LENS BARREL

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 653 days.

(21) Appl. No.: 11/458,586

(22) Filed: Jul. 19, 2006

(65) Prior Publication Data

US 2007/0019938 A1    Jan. 25, 2007

(30) Foreign Application Priority Data

Jul. 22, 2005    (JP) .............................. 2005-212085

(51) Int. Cl.
G03B 17/00 (2006.01)
(52) U.S. Cl. ..................... 396/73; 396/350; 396/544
(58) Field of Classification Search ................... 396/73, 396/347–350, 75, 544; 352/85, 91 C; 359/889, 359/697, 702, 695, 723, 817, 823, 824; 348/239, 348/344, 360, 361, 270
See application file for complete search history.

(56) References Cited

U.S. PATENT DOCUMENTS

| | | | |
|---|---|---|---|
| 4,336,986 A * | 6/1982 | Prochnow | 396/349 |
| 4,381,885 A * | 5/1983 | Coquin | 359/892 |
| 4,721,972 A | 1/1988 | Wakabayashi | |
| 4,771,303 A | 9/1988 | Matsumoto et al. | |
| 4,792,822 A | 12/1988 | Akiyama et al. | |
| 4,825,235 A | 4/1989 | Wakabayashi et al. | |
| 4,937,609 A | 6/1990 | Wakabayashi et al. | |
| 5,079,576 A * | 1/1992 | Kodaira | 396/544 |
| 5,636,062 A * | 6/1997 | Okuyama et al. | 359/700 |
| 5,737,644 A | 4/1998 | Nomura et al. | |
| 5,793,537 A | 8/1998 | Nomura et al. | |
| 5,812,887 A | 9/1998 | Nomura et al. | |
| 5,937,215 A * | 8/1999 | Mogamiya | 396/85 |

(Continued)

FOREIGN PATENT DOCUMENTS

JP    8-334809    12/1996

(Continued)

OTHER PUBLICATIONS

Translation JP2006-072003A.*

(Continued)

*Primary Examiner*—Christopher E Mahoney
*Assistant Examiner*—Linda B Smith
(74) *Attorney, Agent, or Firm*—Greenblum & Bernstein, P.L.C.

(57) ABSTRACT

A lens barrel includes a standard optical element used in a standard photographing operation and an insertable optical element which is selectively inserted into and removed from a photographing optical path. The lens barrel includes an accommodating driving device which moves the standard optical element and the insertable optical element rearward in an optical axis direction from a ready-to-photograph state to a retracted state; an insertable-optical-element drive mechanism which moves the insertable optical element between an inserted position on the optical axis on which the standard optical element is positioned, and a removed position off the optical axis, in the ready-to-photograph state of the lens barrel; and a forced removing device which forces the insertable optical element to move from the inserted position to the removed position independently of the insertable-optical-element drive mechanism when the lens barrel moves from the ready-to-photograph state to the retracted state.

11 Claims, 29 Drawing Sheets

U.S. PATENT DOCUMENTS

| | | | |
|---|---|---|---|
| 6,023,376 A | 2/2000 | Nomura et al. | |
| 6,115,190 A | 9/2000 | Hirai | |
| 6,137,958 A * | 10/2000 | Toyoda | 396/65 |
| 6,204,977 B1 | 3/2001 | Iwasa | |
| 6,366,323 B1 | 4/2002 | Shono | |
| 6,452,732 B1 * | 9/2002 | Okada et al. | 359/813 |
| 6,492,635 B2 * | 12/2002 | Simchoni | 250/225 |
| 6,937,816 B2 * | 8/2005 | Endo et al. | 396/79 |
| 6,952,526 B2 | 10/2005 | Nomura | |
| 6,959,148 B2 | 10/2005 | Nomura | |
| 6,963,694 B2 | 11/2005 | Nomura | |
| 6,965,733 B1 | 11/2005 | Nomura | |
| 6,978,088 B2 | 12/2005 | Nomura | |
| 6,978,089 B2 | 12/2005 | Nomura et al. | |
| 6,987,929 B2 | 1/2006 | Nomura | |
| 6,987,930 B2 | 1/2006 | Nomura | |
| 6,990,291 B2 | 1/2006 | Nomura | |
| 7,010,224 B2 | 3/2006 | Nomura | |
| 7,013,081 B2 | 3/2006 | Nomura et al. | |
| 7,019,915 B2 | 3/2006 | Sakamoto | |
| 7,025,512 B2 | 4/2006 | Nomura | |
| 7,027,727 B2 | 4/2006 | Nomura | |
| 7,031,603 B2 | 4/2006 | Nomura | |
| 7,031,604 B2 | 4/2006 | Nomura | |
| 7,035,535 B2 | 4/2006 | Nomura | |
| 7,039,308 B2 | 5/2006 | Nomura | |
| 7,039,311 B2 | 5/2006 | Nomura | |
| 7,043,154 B2 | 5/2006 | Nomura | |
| 7,050,713 B2 | 5/2006 | Nomura | |
| 7,058,293 B2 | 6/2006 | Nomura | |
| 7,062,163 B2 | 6/2006 | Nomura | |
| 7,068,929 B2 | 6/2006 | Nomura | |
| 7,079,761 B2 | 7/2006 | Nomura | |
| 7,079,762 B2 | 7/2006 | Nomura | |
| 7,085,486 B2 | 8/2006 | Nomura | |
| 7,088,916 B2 | 8/2006 | Nomura | |
| 7,388,722 B2 * | 6/2008 | Nomura et al. | 359/819 |
| 7,430,009 B2 * | 9/2008 | Kokuwa et al. | 348/342 |
| 2002/0044212 A1 * | 4/2002 | Hashimoto | 348/335 |
| 2003/0156832 A1 * | 8/2003 | Nomura et al. | 396/72 |
| 2004/0017764 A1 * | 1/2004 | Suzuki et al. | 369/244 |
| 2004/0051968 A1 | 3/2004 | Nomura | |
| 2004/0141737 A1 | 7/2004 | Nomura | |
| 2005/0168847 A1 | 8/2005 | Sasaki | |
| 2005/0169621 A1 | 8/2005 | Nomura | |
| 2005/0254140 A1 | 11/2005 | Sakamoto | |

FOREIGN PATENT DOCUMENTS

| | | |
|---|---|---|
| JP | 2001-264610 | 9/2001 |
| JP | 2004151131 A * | 5/2004 |
| JP | 2006072003 A * | 3/2006 |

OTHER PUBLICATIONS

Translation JP2004-151131.*
English Language Abstract of JP 8-334809.
U.S. Appl. No. 11/421,267 to Nomura et al., filed May 31, 2006.
U.S. Appl. No. 11/421,223 to Nomura et al., filed May 31, 2006.
U.S. Appl. No. 11/425,009 to Nomura et al., filed Jun. 19, 2006.
U.S. Appl. No. 11/425,168 to Nomura, filed Jun. 20, 2006.
U.S. Appl. No. 11/458,491 to Nomura, filed Jul. 19, 2006.
U.S. Appl. No. 11/420,952 to Sasaki, filed May 30, 2006.
U.S. Appl. No. 11/420,680 to Sasaki, filed May 26, 2006.
U.S. Appl. No. 10/815,193 to Shono, filed Apr. 1, 2004.
U.S. Appl. No. 10/815,194 to Shono, filed Apr. 1, 2004.

* cited by examiner

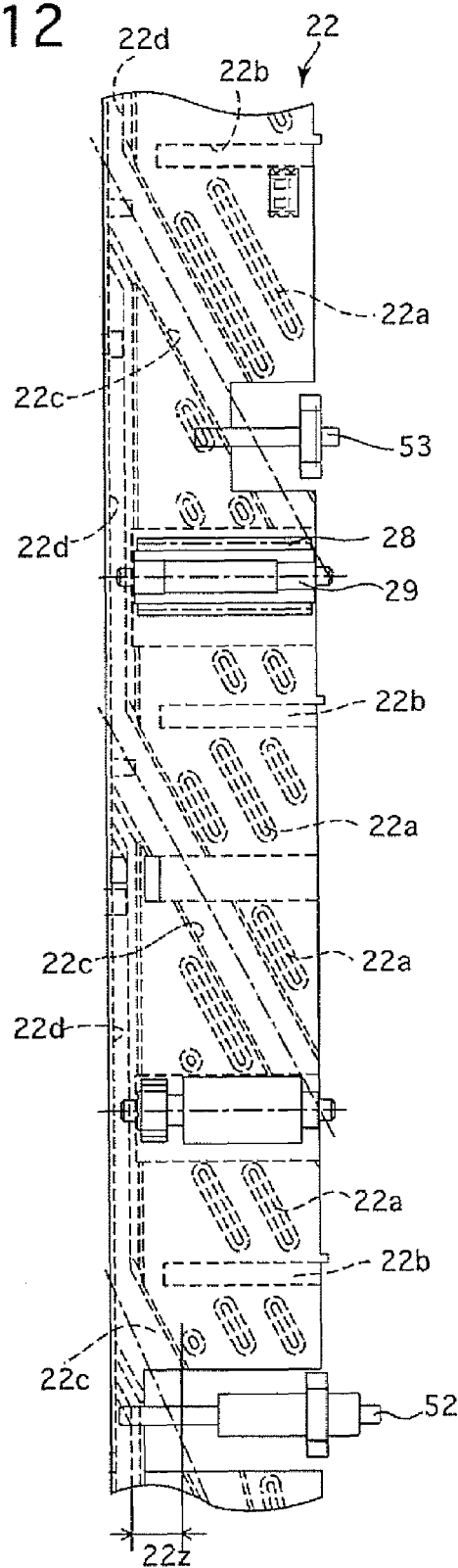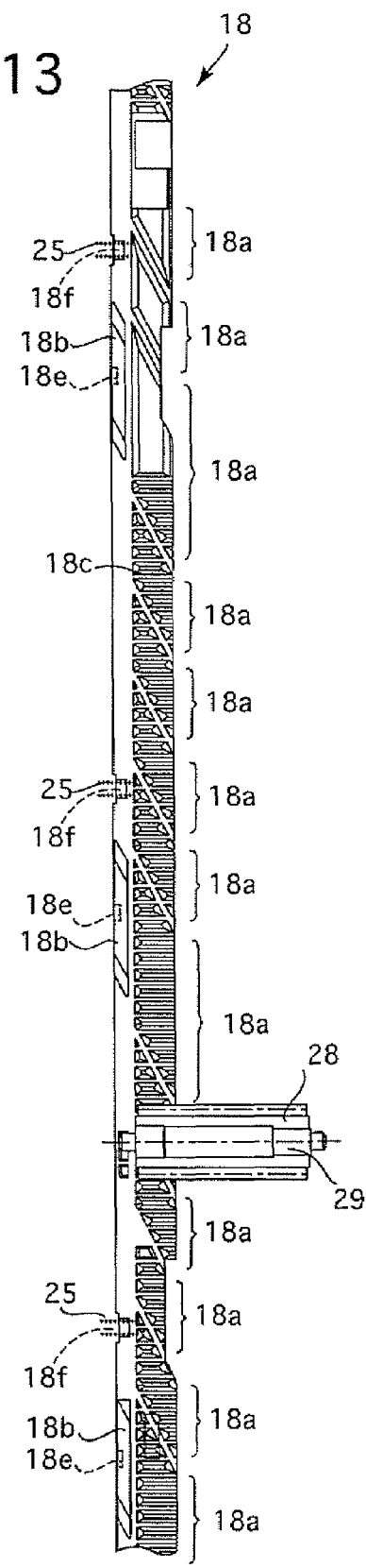

Fig. 21
Fig. 20
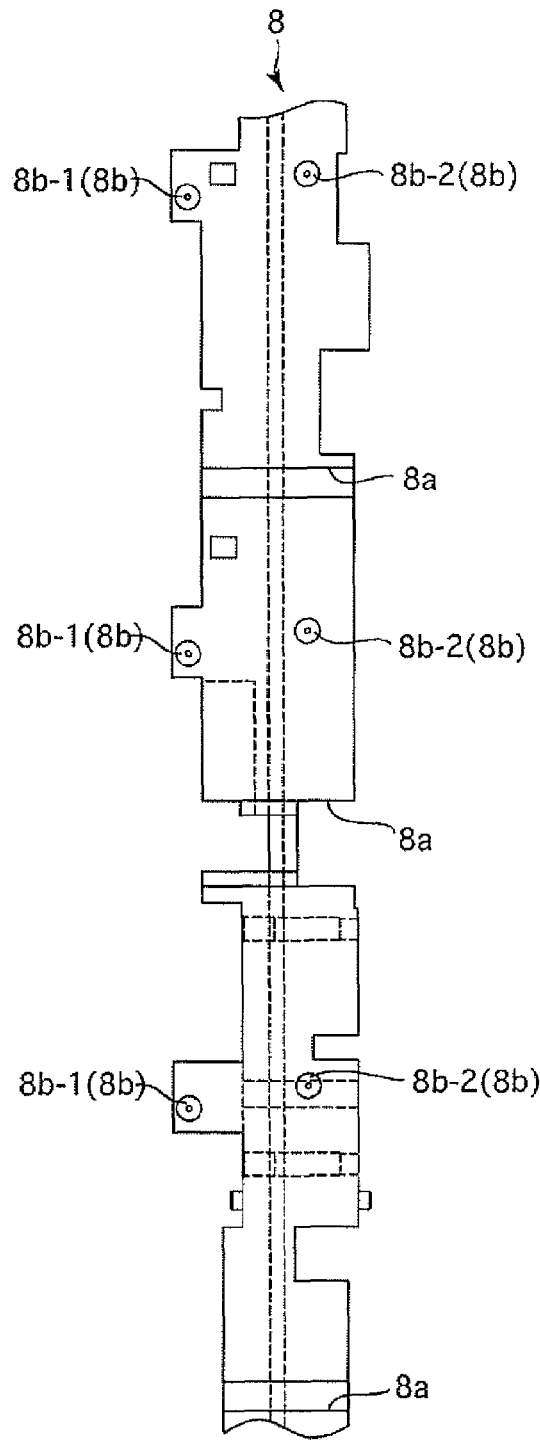
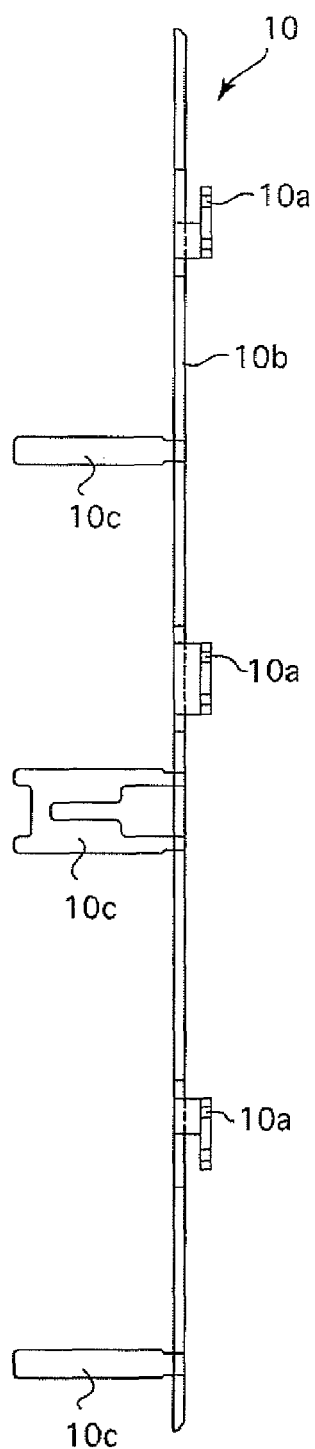

RETRACTABLE LENS BARREL

BACKGROUND OF THE INVENTION

1. Field of the Invention

The present invention relates to a retractable lens barrel that reduces the length thereof when not in use, and more specifically, relates to such a retractable lens barrel including at least one insertable optical element which is inserted into and removed from a photographic optical path, wherein the insertable optical element is of a type that produces a specific photographic effect when positioned in the photographic optical path.

2. Description of the Related Art

In the case of providing a lens barrel with an insertable optical element such as an optical filter (e.g., a polarizing filter) or a wide-angle converter lens, wherein the insertable optical element is positioned on and off a photographing optical axis when the insertable optical element is in use and not in use, respectively, the operability of the insertable optical element in the case where the insertable optical element is inserted into and removed from a photographic optical path on the photographing optical axis by a drive mechanism incorporated in the lens barrel is better than that in the case where the insertable optical element is manually inserted into and removed from a photographic optical path on the photographing optical axis.

In compact cameras, there has been a strong demand for miniaturization of the lens barrel when the lens barrel is accommodated (fully retracted), and it is conceivable to move the insertable optical element to a position off (away from) the photographing optical axis when the lens barrel is accommodated so that the lens barrel can be accommodated efficiently in a space-saving manner. In a type of lens barrel which incorporates a mechanism for inserting and removing the insertable optical element, the insertable optical element can be driven to move off the photographing optical axis in response to a signal which is generated when the lens barrel is accommodated. However, in the event of the insertable optical element not fully removing off the photographing optical axis due to some malfunction in the operation of the drive mechanism for the insertable optical element, there is a possibility of the insertable optical element interfering with other elements that are moved when the lens barrel is accommodated, which may cause damage to the lens barrel. To prevent this from occurring, the lens barrel needs to be provided with a detector for detecting a removed state of the insertable optical element, which causes an increase in production cost and dimensions of the lens barrel.

SUMMARY OF THE INVENTION

The present invention provides a retractable lens barrel including at least one insertable optical element which can be selectively inserted into and removed from a photographic optical path, wherein the insertable optical element can be reliably removed from the photographic optical path on the photographing optical axis by a simple and low-cost structure when the lens barrel moves from a ready-to-photograph state to the retracted state thereof.

According to an aspect of the present invention, a lens barrel is provided, including at least one standard optical element used in a standard photographing operation and at least one insertable optical element which is selectively inserted into and removed from a photographing optical path, a photographic effect being produced by the insertable optical element when the insertable optical element is positioned in the photographic optical path. The lens barrel includes an accommodating driving device which moves the standard optical element and the insertable optical element rearward in an optical axis direction to change the lens barrel from a ready-to-photograph state to a retracted state; an insertable-optical-element drive mechanism which moves the insertable optical element between an inserted position, in which the insertable optical element is positioned on the optical axis on which the standard optical element is positioned, and a removed position, in which the insertable optical element is positioned off the optical axis, in accordance with an insertion signal and a remove signal for the insertable optical element, respectively, in the ready-to-photograph state of the lens barrel; and a forced removing device which forces the insertable optical element to move from the inserted position to the removed position independently of the insertable-optical-element drive mechanism when the lens barrel moves from the ready-to-photograph state to the retracted state by the accommodating driving device.

It is desirable for the lens barrel to include a plurality of the standard optical elements, wherein the lens barrel further includes a removable optical element holding frame which holds a removable part of the plurality of standard optical elements, wherein the removable optical element holding frame is movable in a plane orthogonal to the optical axis between a photographing position, in which the removable part of the plurality of standard optical elements is positioned on the optical axis, and a retracted position, in which the removable part of the plurality of standard optical elements is positioned off the optical axis; a removing device which moves the removable optical element holding frame to the photographing position when the lens barrel is in the ready-to-photograph state, and moves the removable optical element holding frame to the retracted position when lens barrel moves from the ready-to-photograph state to the retracted state; and an insertable optical element holding frame which holds the insertable optical element and is movable in a plane orthogonal to the optical axis. The forced removing device includes a holding-frame linkage portion which applies a force on the insertable optical element holding frame so as to move the insertable optical element holding frame in a direction to move the insertable optical element from the inserted position to the removed position when the removable optical element holding frame moves from the photographing position to the retracted position.

It is desirable for the holding-frame linkage portion to include two contacting portions provided on one and the other of the removable optical element holding frame and the insertable optical element holding frame, wherein the two contacting portions come in contact with each other when the removable optical element holding frame is positioned in the photographing position and also when the insertable optical element holding frame is positioned an inserted position in which the insertable optical element is in the inserted position thereof.

It is desirable for the lens barrel to include a removable-frame positioning device which determines a limit of movement of the removable optical element holding frame in a direction toward the photographing position thereof by making contact with the removable optical element holding frame when the lens barrel is in the ready-to-photograph state. The contact of the two contacting portions with each other determines a limit of movement of the insertable optical element holding frame in an insertion direction toward the inserted position thereof.

In a state where the removable optical element holding frame and the insertable optical element holding frame are positioned in the photographing position and the inserted position, respectively, with the two contacting portions being in contact with each other, it is desirable for the insertable-optical-element drive mechanism to rotate the insertable optical element relative to the insertable optical element holding frame when the insertable-optical-element drive mechanism applies a further moving force to the insertable optical element holding frame in the insertion direction thereof.

It is desirable for the insertable optical element to include a circular optical element which is supported by the insertable optical element holding frame to be rotatable on an axis of the circular optical element.

It is desirable for the lens barrel to include a linearly movable frame which is guided linearly in the optical axis direction and moves rearward when the lens barrel moves from the ready-to-photograph state to the retracted state. The removable optical element holding frame and the insertable optical element holding frame are supported by the linearly movable frame to be movable in the respective planes orthogonal to the optical axis.

It is desirable for the removable optical element holding frame and the insertable optical element holding frame to be pivoted about a common shaft provided on the linearly movable frame.

It is desirable for the common shaft to extend in the optical axis direction.

It is desirable for the insertable optical element to include a polarizing filter.

It is desirable for the removable part of the plurality of standard optical elements to be a lens element.

It is desirable for the removable optical element holding frame and the insertable optical element holding frame to have substantially the same shape and size as viewed in the optical axis direction.

In an embodiment, a lens barrel is provided, including a plurality of standard optical elements used in a standard photographing operation and at least one insertable optical element which is selectively inserted into and removed from a photographing optical path, a photographic effect being produced by the insertable optical element when the insertable optical element is positioned in the photographic optical path. The lens barrel includes a removable optical element holding frame which holds a removable part of the plurality of standard optical elements, wherein the removable optical element holding frame is movable in a plane orthogonal to the optical axis between a photographing position, in which the removable part of the plurality of standard optical elements is positioned on the optical axis, and a retracted position, in which the removable part of the plurality of standard optical elements is positioned off the optical axis; a removing device which moves the removable optical element holding frame to the photographing position when the lens barrel is in a ready-to-photograph state, and moves the removable optical element holding frame to the retracted position when lens barrel moves from the ready-to-photograph state to a retracted state; an insertable optical element holding frame which holds the insertable optical element and is movable in a plane orthogonal to the optical axis; an insertable-optical-element drive mechanism which moves the insertable optical element holding frame between an inserted position, in which the insertable optical element is positioned on the optical axis, and a removed position, in which the insertable optical element is positioned off the optical axis, in accordance with an insertion signal and a remove signal for the insertable optical element, respectively; and a linkage which links the insertable optical element holding frame with the removable optical element holding frame independently of the insertable-optical-element drive mechanism to move the insertable optical element holding frame from the inserted position to the removed position thereof when the removable optical element holding frame moves from the photographing position to the removed position.

According to the present invention, even if a malfunction occurs in the operation of the drive mechanism for the insertable optical element, the insertable optical element can be reliably removed from the photographic optical path on the photographing optical axis by a simple and low-cost structure when the lens barrel moves from a ready-to-photograph state to the retracted state thereof.

The present disclosure relates to subject matter contained in Japanese Patent Application No. 2005-212085 (filed on Jul. 22, 2005) which is expressly incorporated herein by reference in its entirety.

BRIEF DESCRIPTION OF THE DRAWINGS

The present invention will be described below in detail with reference to the accompanying drawings in which:

FIG. 12 is a developed view of the stationary barrel shown in FIG. 11;

FIG. 13 is a developed view of a helicoid ring shown in FIG. 11;

FIG. 20 is a developed view of a second linear guide ring shown in FIG. 10;

FIG. 21 is a developed view of a second lens group moving frame shown in FIG. 10;

DESCRIPTION OF THE PREFERRED EMBODIMENT

Figure 1:
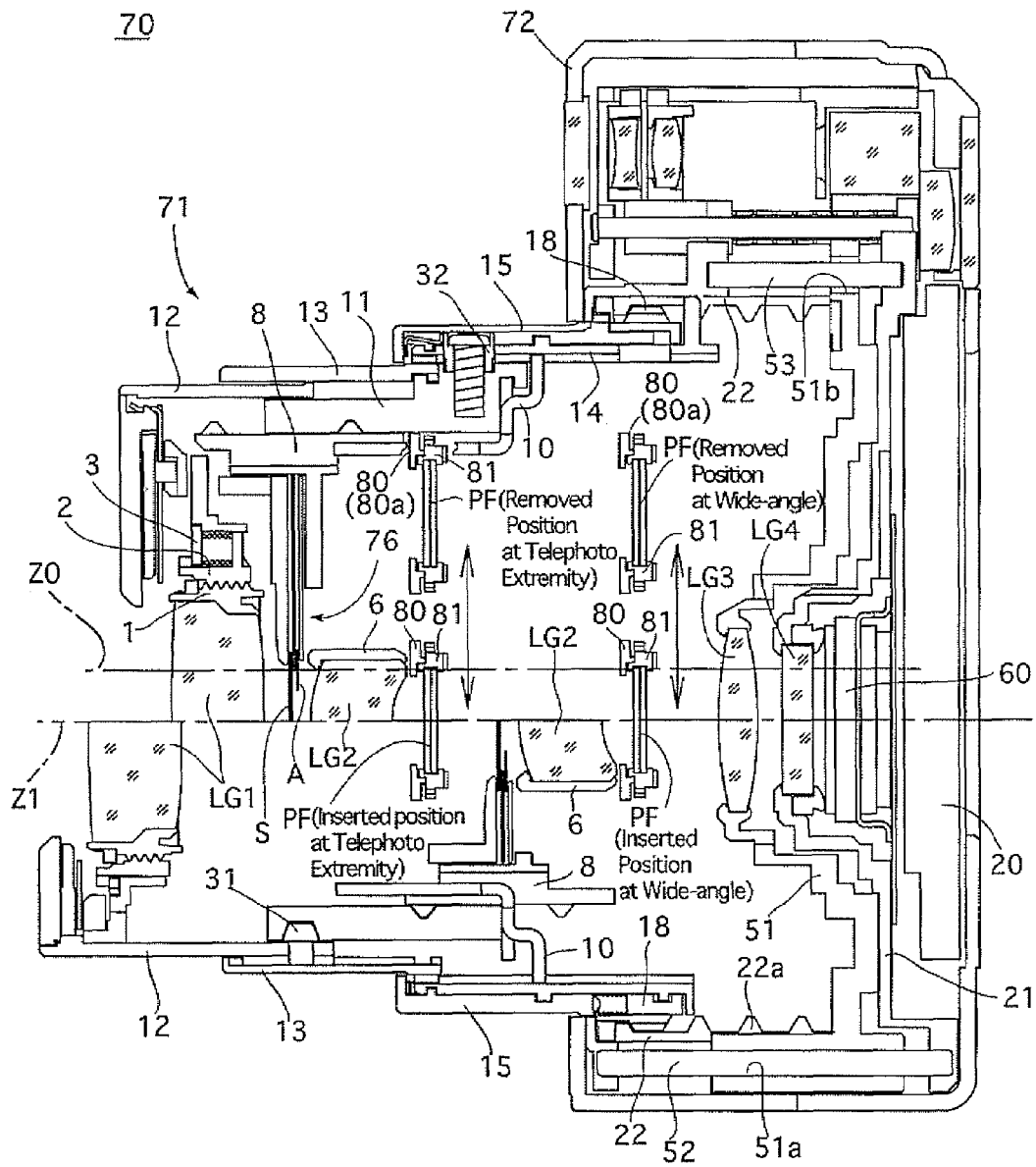
FIG. 1 is a longitudinal sectional view of an embodiment of a digital camera in a ready-to-photograph state thereof, wherein the digital camera includes a retractable zoom lens according to the present invention.
Figure 2:
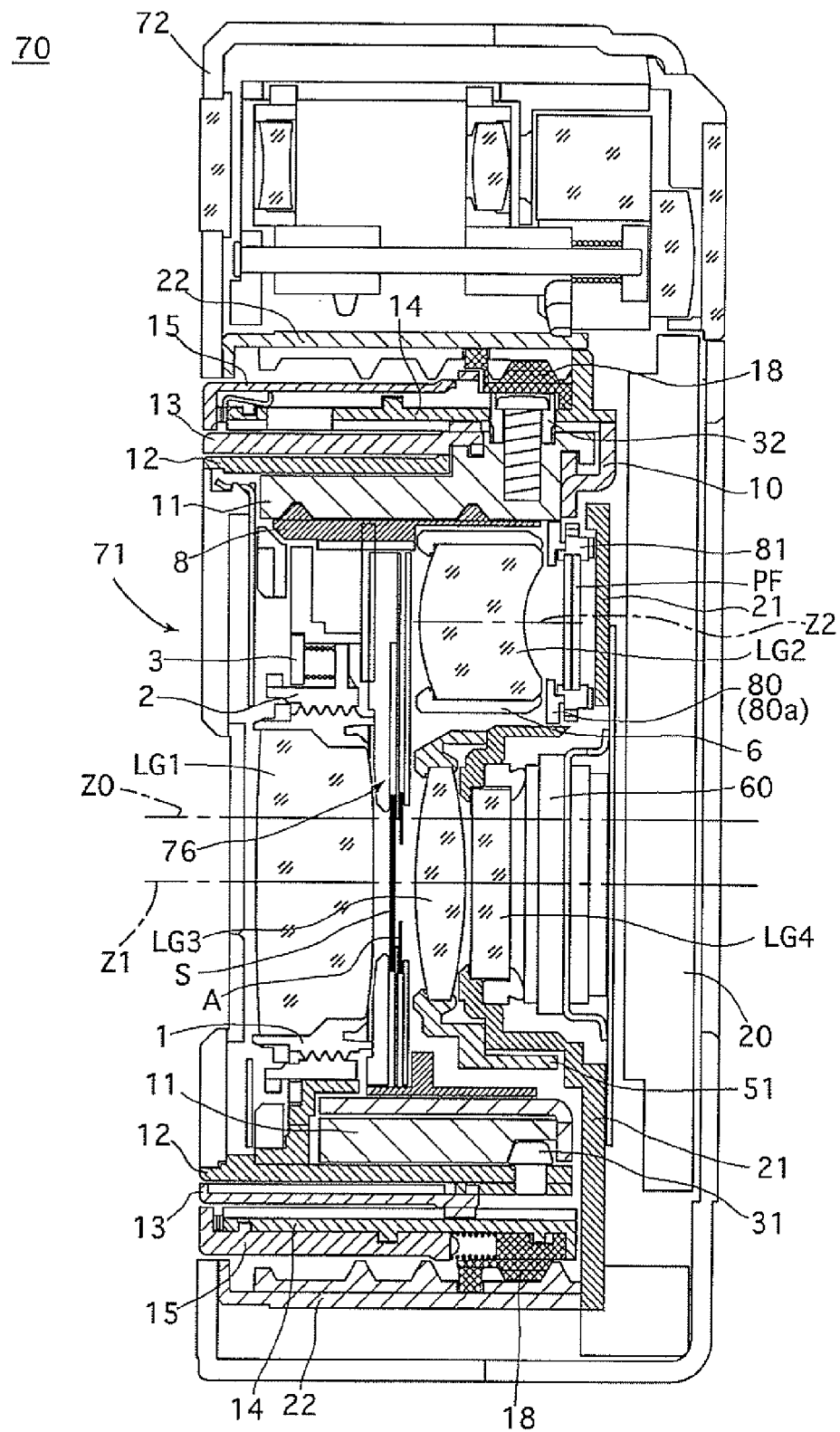
FIG. 2 is a longitudinal sectional view of the digital camera shown in FIG. 1, showing the zoom lens in the fully-retracted state.
Figure 8:
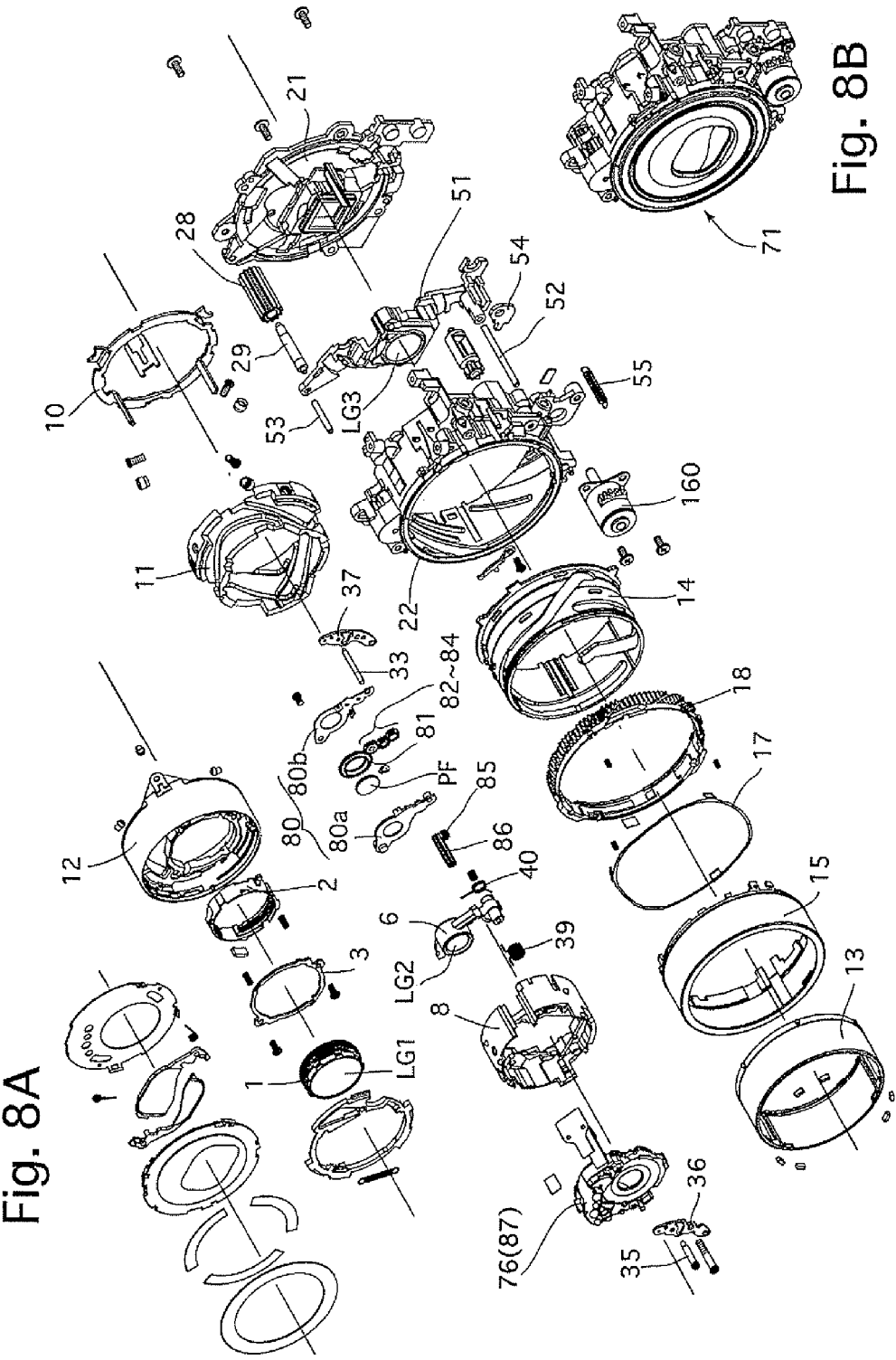
FIG. 8A is an exploded perspective view of elements of the zoom lens shown in FIGS. 1 and 2.
FIG. 8B is a perspective view of the elements of the zoom lens shown in FIG. 8A in an assembled state.

A zoom lens (zoom lens barrel) 71 of a digital camera 70, cross sections of which are shown in FIGS. 1 and 2, is changeable between a ready-to-photograph state shown in FIG. 1, in which the zoom lens 71 has advanced from a camera body 72 toward the object side, and an accommodated state (fully-retracted state) shown in FIG. 2, in which the zoom lens 71 is fully retracted into the camera body 72. In FIG. 1, a cross sectional view of an upper half portion of the zoom lens 71 above a photographing optical axis Z1 thereof shows a state of the zoom lens 71 at the telephoto extremity, while a cross sectional view of a lower half portion of the zoom lens 71 below the photographing optical axis Z1 shows a state of the zoom lens 71 at the wide-angle extremity. As shown in FIG. 8A, the zoom lens 71 is provided with a plurality of concentrically arranged ring members (cylindrical members): a second linear guide ring (second-lens-group linear guide ring) 10, a cam ring 11, a first external barrel 12, a second external barrel 13, a first linear guide ring 14, a third external barrel 15, a helicoid ring 18 and a stationary barrel 22 which are substantially concentrically arranged about a common axis that is shown as a lens barrel axis Z0 shown in FIGS. 1 and 2.

The zoom lens 71 is provided with a photographing optical system including a first lens group LG1, a shutter S, an adjustable diaphragm A, a second lens group LG2, a third lens group LG3, a low-pass filter (optical filter) LG4, and a CCD image sensor (solid-state image pick-up device) 60. The zoom lens 71 is further provided with a polarizing filter (insertable optical element) PF serving as an insertable optical element which can be inserted into and removed from a photographing optical path between the second lens group LG2 and the third lens group LG3 in a ready-to-photograph state of the zoom lens 71. Optical elements from the first lens group LG1 to the CCD image sensor 60 except the polarizing filter PF serve as standard optical elements (minimum optical elements which are required for imaging object images) which are positioned on the photographing optical axis (common optical axis) Z1 when the zoom lens 71 is in a ready-to-photograph state. The photographing optical axis Z1 is parallel to the lens barrel axis Z0 and positioned below the lens barrel axis Z0. The first lens group LG1 and the second lens group LG2 are moved along the photographing optical axis Z1 in a predetermined moving manner to perform a zooming operation, while the third lens group L3 is moved along the photographing optical axis Z1 to perform a focusing operation. In the following description, the term "optical axis direction" refers to a direction parallel to the photographing optical axis Z1. Additionally, in the following description, the term "forward/rearward direction" refers to a direction along the photographing optical axis Z; the forward direction (the left side as viewed in FIG. 1) and the rearward direction (the right side as viewed in FIG. 1) are defined as being toward the object side and toward the image side, respectively.

As shown in FIGS. 1 and 2, the stationary barrel 22 is positioned in the camera body 72 and fixed to the camera body 72, while a CCD holder 21 is fixed to a rear portion of the stationary barrel 22. The CCD image sensor 60 and the low-pass filter LG4 are supported by the CCD holder 21 thereon. The camera 70 is provided behind the CCD holder 21 with an LCD panel 20 which indicates visual images and various photographic information.

Figure 11:
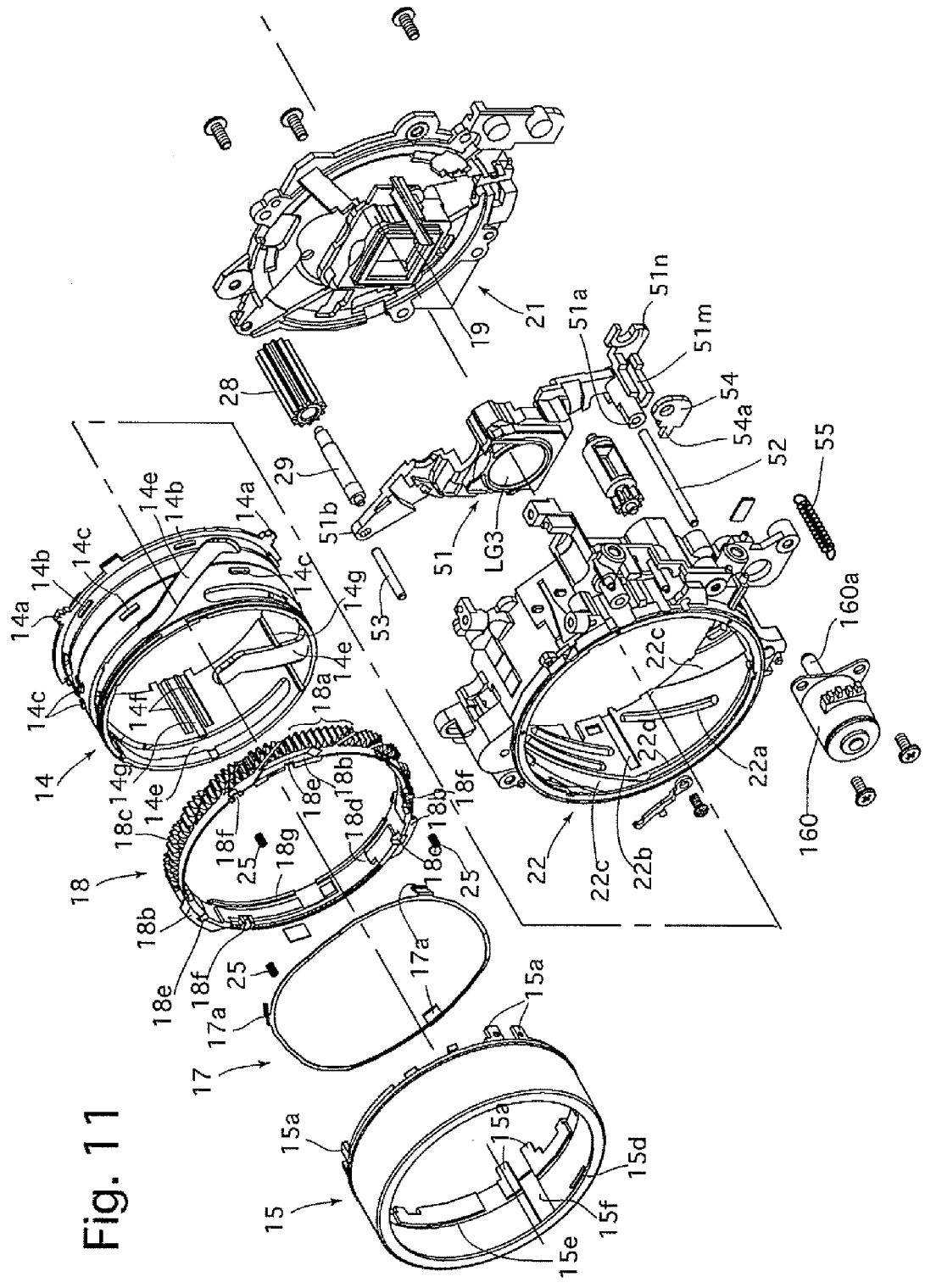
FIG. 11 is an exploded perspective view of portions of the zoom lens shown in FIG. 8A, showing elements of an advancing/retracting mechanism of the zoom lens from a stationary barrel to a third external barrel.

The zoom lens 71 is provided in the stationary barrel 22 with an AF lens frame (third lens frame which supports and holds the third lens group LG3) 51. The zoom lens 71 is provided between the CCD holder 21 and the stationary barrel 22 with an AF guide shaft 52 and a rotation preventive shaft 53 which extend parallel to the photographing optical axis Z1 to guide the AF lens frame 51 in the optical axis direction without rotating the AF lens frame 51 about the lens barrel axis Z0. Front and rear ends of each of the AF guide shaft 52 and the rotation preventive shaft 53 are fixed to the stationary barrel 22 and the CCD holder 21, respectively. The AF lens frame 51 is provided on radially opposite sides thereof with a pair of guide holes 51a and 51b in which the AF guide shaft 52 and the rotation preventive shaft 53 are respectively fitted so that the AF lens frame 51 is slidable on the AF guide shaft 52 and the rotation preventive shaft 53. As shown in FIG. 11, the camera 70 is provided with an AF motor 160 having a rotary drive shaft 160a which is threaded to serve as a feed screw shaft, and the rotary drive shaft 160a is screwed through a screw hole formed on an AF nut 54. The AF nut 54 is provided with a rotation-preventing protrusion 54a. The AF lens frame 51 is provided with a guide groove 51m, extending in a direction parallel to the optical axis Z1, in which the rotation-preventing protrusion 54a is slidably fitted. Furthermore, the AF lens frame 51 is provided with a stopper protrusion 51n which is positioned behind the AF nut 54. The AF lens frame 51 is biased forward in the optical axis direction by an extension coil spring 55 serving as a biasing member, and the forward movement limit of the AF lens frame 51 is determined via engagement between the stopper protrusion 51n and the AF nut 54. If the AF nut 54 is moved rearward by a rotation of the rotary drive shaft 160a, the AF lens frame 51 is pressed by the AF nut 54 to move rearward. Conversely, if the AF nut 54 is moved forward, the AF lens frame 51 follows the AF nut 54 to move forward by the biasing force of the extension coil spring 55. Due to this structure, the AF lens frame 51 can be moved forward and rearward in the optical axis direction.

Figure 7:
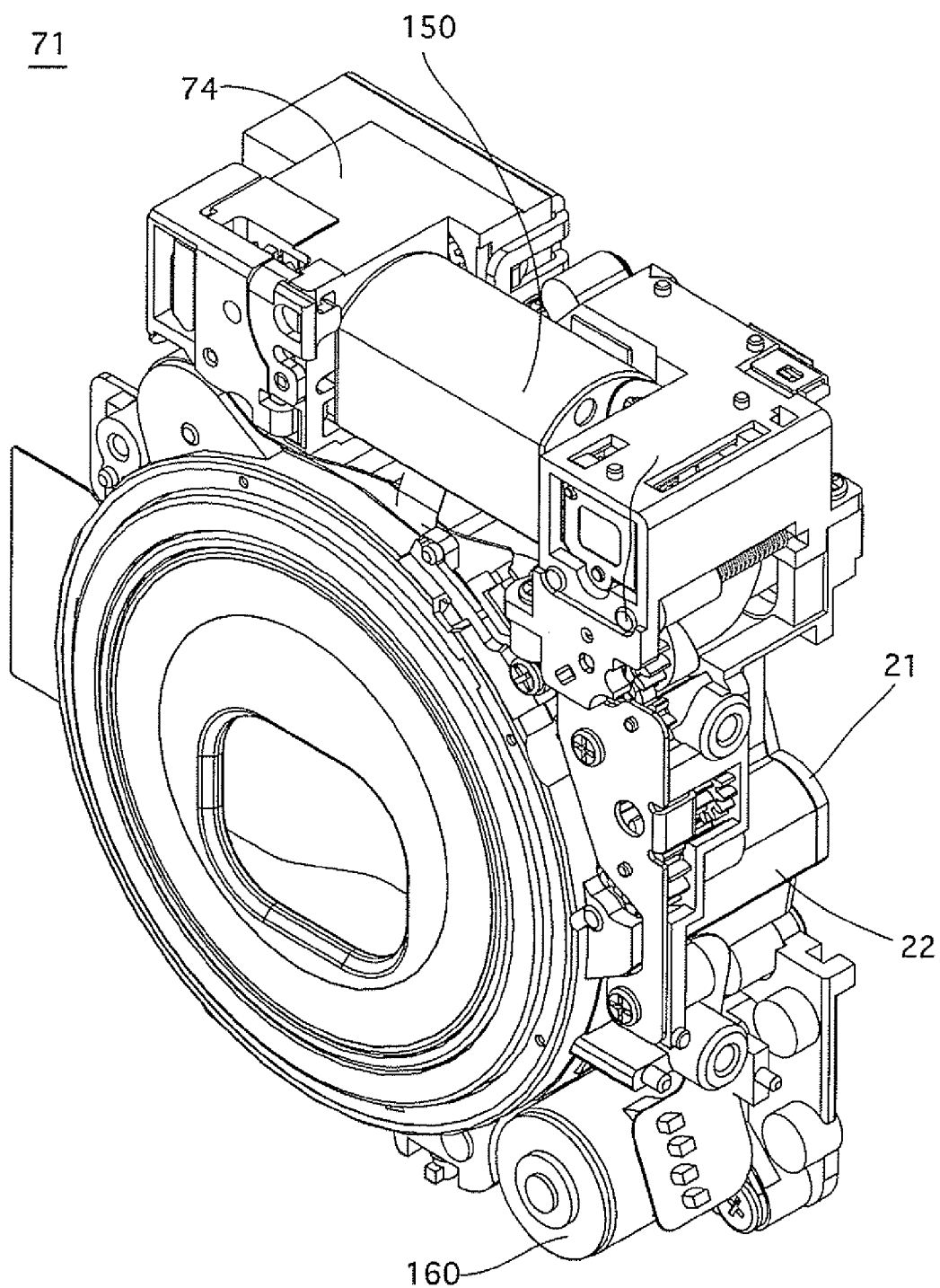
FIG. 7 is a perspective view of the zoom lens (the entire retractable zoom lens unit) in the same state as that shown in FIG. 2.

As shown in FIG. 7, the camera 70 is provided above the stationary barrel 22 with a zoom motor 150 and a reduction gear train box 74 which are mounted on the stationary barrel 22. The reduction gear train box 74 contains a reduction gear train for transferring rotation of the zoom motor 150 to a zoom gear 28 (see FIGS. 8A, 8B and 11 through 13). The zoom gear 28 is rotatably fitted on a zoom gear shaft 29 extending parallel to the photographing optical axis Z1. Front and rear ends of the zoom gear shaft 29 are fixed to the stationary barrel 22 and the CCD holder 21, respectively.

As shown in FIGS. 11 and 12, the stationary barrel 22 is provided on an inner peripheral surface thereof with a female helicoid 22a, a set of three linear guide grooves 22b, a set of three inclined grooves 22c, and a set of three rotational sliding grooves 22d. Threads of the female helicoid 22a extend in a direction inclined with respect to both the optical axis direction and a circumferential direction of the stationary barrel 22. The set of three linear guide grooves 22b extend parallel to the photographing optical axis Z1. The set of three inclined grooves 22c extend parallel to the female helicoid 22a. The set of three rotational sliding grooves 22d are formed in the vicinity of a front end of the inner peripheral surface of the stationary barrel 22 to extend along a circumferential direction of the stationary barrel 22 to communicate the front ends of the set of three inclined grooves 22c, respectively. The female helicoid 22a is not formed on the specific front area (non-helicoid area 22z; see FIG. 12) of the inner peripheral surface of the stationary barrel 22 which is positioned on a front part of the inner peripheral surface of the stationary barrel 22 immediately behind the set of three rotational sliding grooves 22d.

As shown in FIGS. 11 and 13, the helicoid ring 18 is provided on an outer peripheral surface thereof with a male helicoid 18a and a set of three rotational sliding projections 18b. The male helicoid 18a is engaged with the female helicoid 22a, and the set of three rotational sliding projections 18b are engaged in the set of three inclined grooves 22c or the set of three rotational sliding grooves 22d, respectively. The helicoid ring 18 is provided on the threads of the male helicoid 18a with an annular gear 18c which is in mesh with the zoom gear 28. Therefore, when a rotation of the zoom gear 28 is transferred to the annular gear 18c, the helicoid ring 18 moves forward or rearward in the optical axis direction while rotating about the lens barrel axis Z0 within a predetermined range in which the male helicoid 18a remains in mesh with the female helicoid 22a. A forward movement of the helicoid ring 18 beyond a predetermined point with respect to the stationary barrel 22 causes the male helicoid 18a to be disengaged from the female helicoid 22a so that the helicoid ring 18 rotates about the lens barrel axis Z0 without moving in the optical axis direction relative to the stationary barrel 22 by the engagement of the set of three rotational sliding projections 18b with the set of three rotational sliding grooves 22d. The set of three inclined grooves 22c are formed on the stationary barrel 22 to prevent the set of three rotational sliding projections 18b and the stationary barrel 22 from interfering with each other when the female helicoid 22a and the male helicoid 18a are engaged with each other.

The helicoid ring 18 is provided, on an inner peripheral surface thereof at three different circumferential positions on the helicoid ring 18, with three rotation transfer recesses 18d (see FIG. 11; only one of them is shown in FIG. 11) front ends of which are open at the front end of the helicoid ring 18, and the third external barrel 15 is provided, at corresponding three different circumferential positions on the third external barrel 15, with three pairs of rotation transfer projections 15a (see FIGS. 11 and 14) which project rearward from the rear end of the third external barrel 15 to be inserted into the three rotation transfer recesses 18d from the front thereof, respectively. The three pairs of rotation transfer projections 15a and the three rotation transfer recesses 18d are slidingly movable relative to each other in a direction of the lens barrel axis Z0, and are not rotatable relative to each other about the lens barrel axis Z0. Namely, the helicoid ring 18 and the third external barrel 15 integrally rotate. The helicoid ring 18 is provided, on front faces of the three rotational sliding projections 18b at three different circumferential positions on the helicoid ring 18, with a set of three engaging recesses 18e which are formed on an inner peripheral surface of the helicoid ring 18 to be open at the front end of the helicoid ring 18. The third external barrel 15 is provided, at corresponding three different circumferential positions on the third external barrel 15, with a set of three engaging projections 15b which project rearward from the rear end of the third external barrel 15, and also project radially outwards, to be engaged in the set of three engaging recesses 18e from the front thereof, respectively. The set of three engaging projections 15b, which are respectively engaged in the set of three engaging recesses 18e, are also simultaneously engaged in the set of three rotational sliding grooves 22d, respectively, when the set of three rotational sliding projections 18b are engaged in the set of three rotational sliding grooves 22d (see FIG. 3).

The zoom lens 71 is provided between the third external barrel 15 and the helicoid ring 18 with three compression coil springs 25 (see FIGS. 4, 6, 11 and 13) which bias the third external barrel 15 and the helicoid ring 18 in opposite directions away from each other in the optical axis direction. The rear ends of the three compression coil springs 25 are respectively inserted into three spring support holes (insertion recess) 18f which are formed on the front end of the helicoid ring 18, and the front ends of the three compression coil springs 25 are respectively in pressing contact with three engaging recesses 15c (see FIG. 14) formed at the rear end of the third external barrel 15. Therefore, the set of three engaging projections 15b of the third external barrel 15 are respectively pressed against front guide surfaces of the rotational sliding grooves 22d by the spring force of the three compression coil springs 25. At the same time, the set of three rotational sliding projections 18b of the helicoid ring 18 are respectively pressed against rear guide surfaces of the rotational sliding grooves 22d by the spring force of the three compression coil springs 25.

Figure 14:
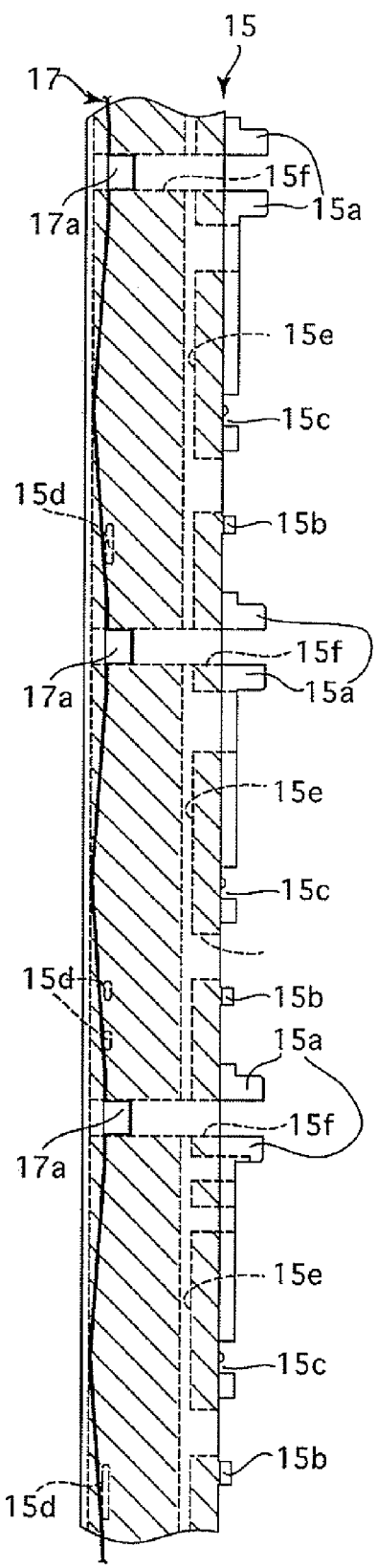
FIG. 14 is a developed view of the third external barrel shown in FIG. 11.

As shown in FIGS. 11 and 14, the third external barrel 15 is provided on an inner peripheral surface thereof with a plurality of relative rotation guide projections 15d which are formed at different circumferential positions on the third external barrel 15, a circumferential groove 15e which extends in a circumferential direction about the lens barrel axis Z0, and a set of three rotation transfer grooves 15f which extend parallel to the lens barrel axis Z0. The plurality of relative rotation guide projections 15d are elongated in a circumferential direction of the third external barrel to lie in a plane orthogonal to the lens barrel axis Z0. As can be seen in FIG. 14, each rotation transfer groove 15f intersects the circumferential groove 15e at right angles. The circumferential positions of the three rotation transfer grooves 15f are formed to correspond to those of the three pairs of rotation transfer projections 15a, respectively. Each rotation transfer groove 15f is open at the rear end of the third external barrel 15. The helicoid ring 18 is provided on an inner peripheral surface thereof with a circumferential groove 18g which extends in a circumferential direction about the lens barrel axis Z0 (see FIGS. 4, 6 and 11). The first linear guide ring 14 is positioned inside of a combination of the third external barrel 15 and the helicoid ring 18 to be supported thereby. The first linear guide ring 14 is provided on an outer peripheral surface thereof with a set of three linear guide projections 14a, a first plurality of relative rotation guide projections 14b, a second plurality of relative rotation guide projections 14c, and a circumferential groove 14d, in that order from rear to front of the first linear guide ring 14 in the optical axis direction (see FIGS. 3 through 6, 11 and 15). The set of three linear guide projections 14a project radially outwards in the vicinity of the rear end of the first linear guide ring 14. The first plurality of relative rotation guide projections 14b project radially outwards at different circumferential positions on the first linear guide ring 14, and are each elongated in a circumferential direction of the first linear guide ring 14 to lie in a plane orthogonal to the lens barrel axis Z0. Likewise, the second plurality of relative rotation guide projections 14c project at different circumferential positions on the first linear guide ring 14, and are each elongated in a circumferential direction of the first linear guide ring 14 to lie in a plane orthogonal to the lens barrel axis Z0. The circumferential groove 14d is an annular groove centered on the lens barrel axis Z0. The first linear guide ring 14 is guided in the optical axis direction with respect to the stationary barrel 22 by the engagement of the set of three linear guide projections 14a with the set of three linear guide grooves 22b, respectively. The third external barrel 15 is coupled to the first linear guide ring 14 to be rotatable about the lens barrel axis Z0 relative to the first linear guide ring 14 by both the engagement of the second plurality of relative rotation guide projections 14c with the circumferential groove 15e and the engagement of the plurality of relative rotation guide projections 15d with the circumferential groove 14d. The second plurality of relative rotation guide projections 14c and the circumferential groove 15e are loosely engaged with each other to be slightly movable relative to each other in the optical axis direction. Likewise, the plurality of relative rotation guide projections 15d and the circumferential groove 14d are loosely engaged with each other to be slightly movable relative to each other in the optical axis direction. The helicoid ring 18 is coupled to the first linear guide ring 14 to be rotatable about the lens barrel axis Z0 relative to the first linear guide ring 14 by the engagement of the first plurality of relative rotation guide projections 14b with the circumferential groove 18g. The first plurality of relative rotation guide projections 14b and the circumferential groove 18g are loosely engaged with each other to be slightly movable relative to each other in the optical axis direction.

Figure 15:
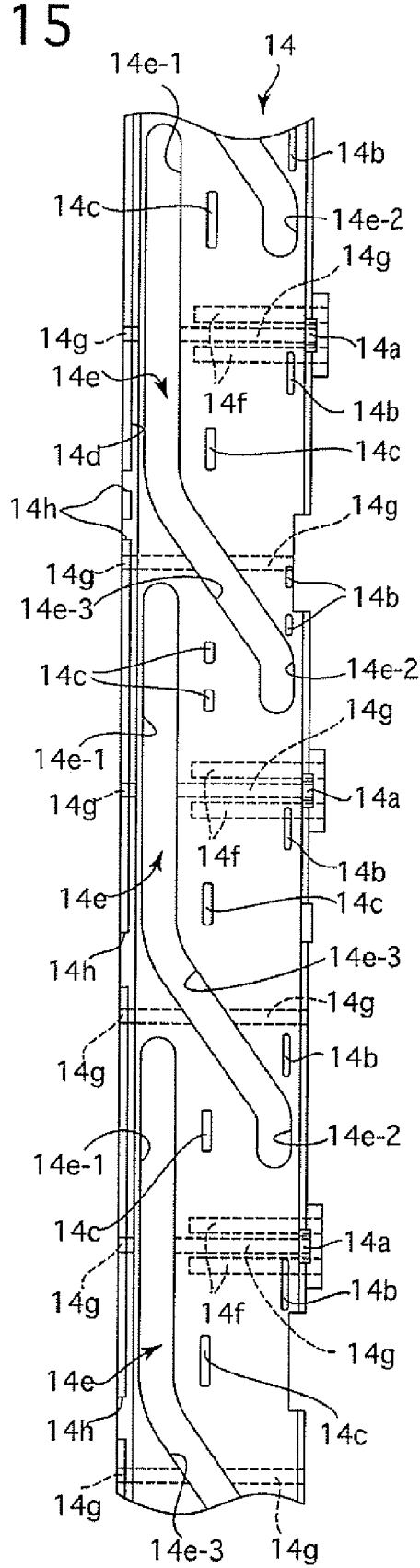
FIG. 15 is a developed view of a first linear guide ring shown in FIG. 11.

The first linear guide ring 14 is provided with a set of three through-slots 14e which radially extend through the first linear guide ring 14. As shown in FIG. 15, each through-slot 14e includes a front circumferential slot portion 14e-1, a rear circumferential slot portion 14e-2, and an inclined lead slot portion 14e-3 which connects the front circumferential slot portion 14e-1 with the rear circumferential slot portion 14e-2. The front circumferential slot portion 14e-1 and the rear circumferential slot portion 14e-2 extend parallel to 5 each other in a circumferential direction of the first linear guide ring 14. A set of three roller followers 32 fixed to an outer peripheral surface of the cam ring 11 at different circumferential positions thereon are engaged in the set of three through-slots 14e, respectively. Each roller follower 32 is fixed to the cam ring 11 by set screw 32a. The set of three roller followers 32 are further engaged in the set of three rotation transfer grooves 15f through the set of three through-slots 14e, respectively. The zoom lens 71 is provided between the first linear guide ring 14 and the third external barrel 15 with a follower-biasing ring spring 17. A set of three follower pressing protrusions 17a protrude rearward from the follower-biasing ring spring 17 to be engaged in front portions of the set of three rotation transfer grooves 15f, respectively (see FIG. 14). The set of three follower pressing protrusions 17a press the set of three roller followers 32 rearward to remove backlash between the set of three roller followers 32 and the set of three through-slots 14e (the front circumferential slot portions 14e-1) when the set of three roller followers 32 are engaged in the front circumferential slot portions 14e-1 of the set of three through-slots 14e, respectively (see FIG. 3).

Advancing operations of movable elements of the zoom lens 71 from the stationary barrel 22 to the cam ring 11 will be discussed hereinafter with reference to the above described structure of the digital camera 70. In the state shown in FIGS. 2, 5 and 6 in which the zoom lens 71 is in the fully-retracted state, rotating the zoom gear 28 in a lens barrel advancing direction by the zoom motor 150 causes the helicoid ring 18 to move forward while rotating about the lens barrel axis Z0 due to the engagement of the female helicoid 22a with the male helicoid 18a. This rotation of the helicoid ring 18 causes the third external barrel 15 to move forward together with the helicoid ring 18 while rotating about the lens barrel axis Z0 together with the helicoid ring 18, and further causes the first linear guide ring 14 to move forward together with the helicoid ring 18 and the third external barrel 15 because each of the helicoid ring 18 and the third external barrel 15 is coupled to the first linear guide ring 14 to make respective relative rotations between the third external barrel 15 and the first linear guide ring 14 and between the helicoid ring 18 and the first linear guide ring 14 possible and to be movable together along a direction of a common rotational axis (i.e., the lens barrel axis Z0) due to the engagement of the first plurality of relative rotation guide projections 14b with the circumferential groove 18g, the engagement of the second plurality of relative rotation guide projections 14c with the circumferential groove 15e, and the engagement of the plurality of relative rotation guide projections 15d with the circumferential groove 14d. Rotation of the third external barrel 15 is transferred to the cam ring 11 via the set of three rotation transfer grooves 15f and the set of three roller followers 32, which are engaged in the set of three rotation transfer grooves 15f, respectively. Since the set of three roller followers 32 are also engaged in the set of three through-slots 14e, respectively, the cam ring 11 moves forward while rotating about the lens barrel axis Z0 relative to the first linear guide ring 14 in accordance with contours of the lead slot portions 14e-3 of the set of three through-slots 14e. Since the first linear guide ring 14 itself moves forward together with the third lens barrel 15 and the helicoid ring 18 as described above, the cam ring 11 moves forward in the optical axis direction by an amount of movement corresponding to the sum of the amount of the forward movement of the first linear guide ring 14 and the amount of the forward movement of the cam ring 11 by the engagement of the set of three roller followers 32 with the lead slot portions 14e-3 of the set of three through-slots 14e, respectively.

In the above described rotating-advancing operations of the cam ring 11, the third external barrel 15 and the helicoid ring 18 are performed while the set of three rotational sliding projections 18b are moving in the set of three inclined grooves 22c, respectively, only when the male helicoid 18a and the female helicoid 22a are engaged with each other. When the helicoid ring 18 moves forward to the ready-to-photograph position thereof shown in FIGS. 1, 3 and 4, the male helicoid 18a and the female helicoid 22a are disengaged from each other so that the set of three rotational sliding projections 18b move from the set of three inclined grooves 22c to the set of three rotational sliding grooves 22d, respectively. Since the helicoid ring 18 does not move in the optical axis direction relative to the stationary barrel 22 even if rotating upon the disengagement of the male helicoid 18a from the female helicoid 22a, the helicoid ring 18 and the third external barrel 15 rotate at respective axial positions thereof without moving in the optical axis direction due to the engagement of the set of three rotational sliding projections 18b with the set of three rotational sliding grooves 22d. Furthermore, at substantially the same time when the set of three rotational sliding projections 18b slide into the set of three rotational sliding grooves 22d from the set of three inclined grooves 22c, respectively, the set of three roller followers 32 enter the front circumferential slot portions 14e-1 of the set of three through-slots 14e, respectively. Thereupon, the cam ring 11 is no longer given any force to also make the cam ring 11 move forward. Consequently, the cam ring 11 only rotates at an axial position in accordance with rotation of the third external barrel 15.

Rotating the zoom gear 28 in a lens barrel retracting direction thereof by the zoom motor 150 causes the aforementioned movable elements of the zoom lens 71 from the stationary barrel 22 to the cam ring 11 to operate in the reverse manner to the above described advancing operations. In this reverse operation, the above described movable elements of the zoom lens 71 retract to their respective retracted positions shown in FIGS. 2, 5 and 6 by rotation of the helicoid ring 18 until the set of three roller followers 32 enter the rear circumferential slot portions 14e-2 of the set of three through-slots 14e, respectively.

The structure of the zoom lens 71 from the cam ring 11 forward will be discussed hereinafter. As shown in FIGS. 11 and 15, the first linear guide ring 14 is provided on an inner peripheral surface thereof with a set of three pairs of first linear guide grooves 14f which are formed at different circumferential positions to extend parallel to the photographing optical axis Z1, and a set of six second linear guide grooves 14g which are formed at different circumferential positions to extend parallel to the photographing optical axis Z1. Each alternate groove of the six second linear guide grooves 14g is positioned in between one pair of first linear guide grooves 14f, i.e., each pair of first linear guide grooves 14f are respectively positioned on the opposite sides of the associated second linear guide groove 14g in a circumferential direction of the first linear guide ring 14. The second linear guide ring 10 is provided on an outer edge thereof with a set of three bifurcated projections 10a (see FIGS. 10 and 20) which project radially outwards from a ring portion 10b of the second linear guide ring 10. Each bifurcated projection 10a is provided at a radially outer end thereof with a pair of radial projections which are respectively engaged in the associated pair of first linear guide grooves 14f. On the other hand, a set of six radial projections 13a (see FIGS. 9 and 18) which are formed on an outer peripheral surface of the second external barrel 13 at a rear end thereof to project radially outwards are engaged in the set of six second linear guide grooves 14g, respectively, to be slidable therealong. Therefore, each of the second external barrel 13 and the second linear guide ring 10 is guided in the optical axis direction via the first linear guide ring 14. The second linear guide ring 10 serves as a linear guide member for guiding the second lens group moving frame (linearly movable frame) 8, which indirectly supports the second lens group LG2, linearly without rotating the second lens group moving frame 8, while the second external barrel 13 serves as a linear guide member for guiding the first external barrel 12, which indirectly supports the first lens group LG1, linearly without rotating the first external barrel 12.

Figure 3:
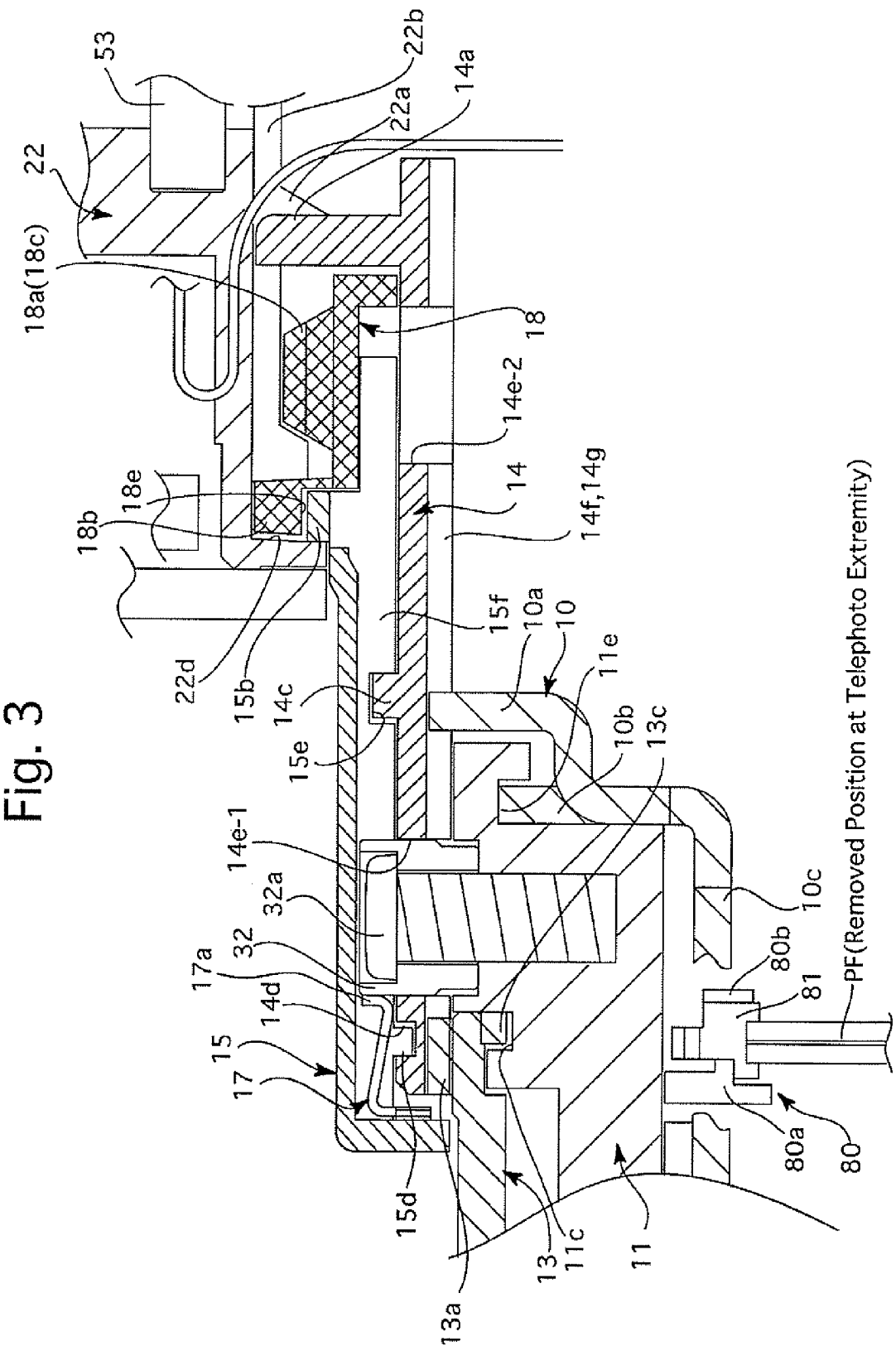
FIG. 3 is an enlarged sectional view of a portion of the zoom lens shown in FIGS. 1 and 2 when the zoom lens is at the telephoto extremity.
Figure 4:
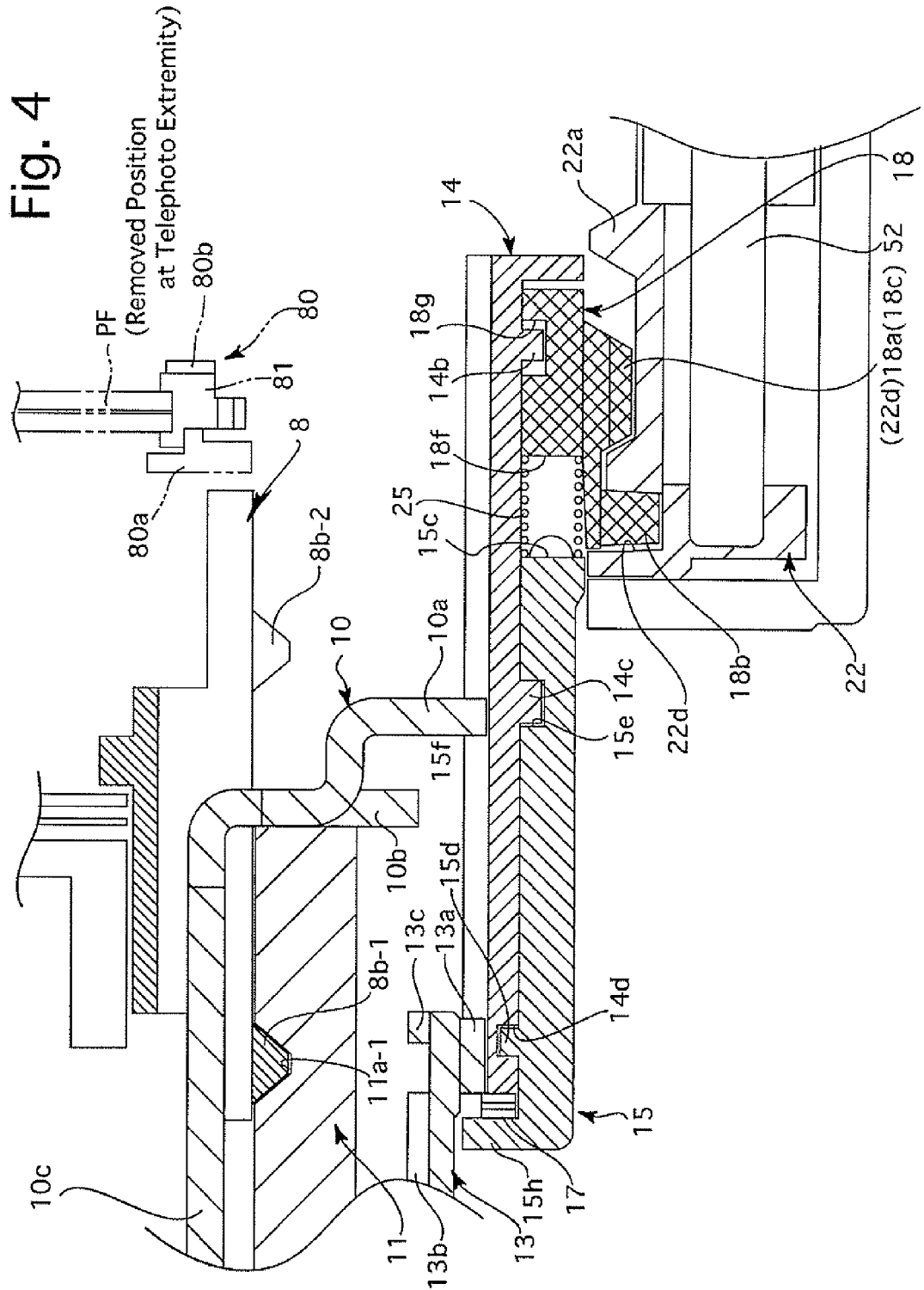
FIG. 4 is an enlarged sectional view of a portion of the zoom lens shown in FIGS. 1 and 2 when the zoom lens is at the wide-angle extremity.
Figure 5:
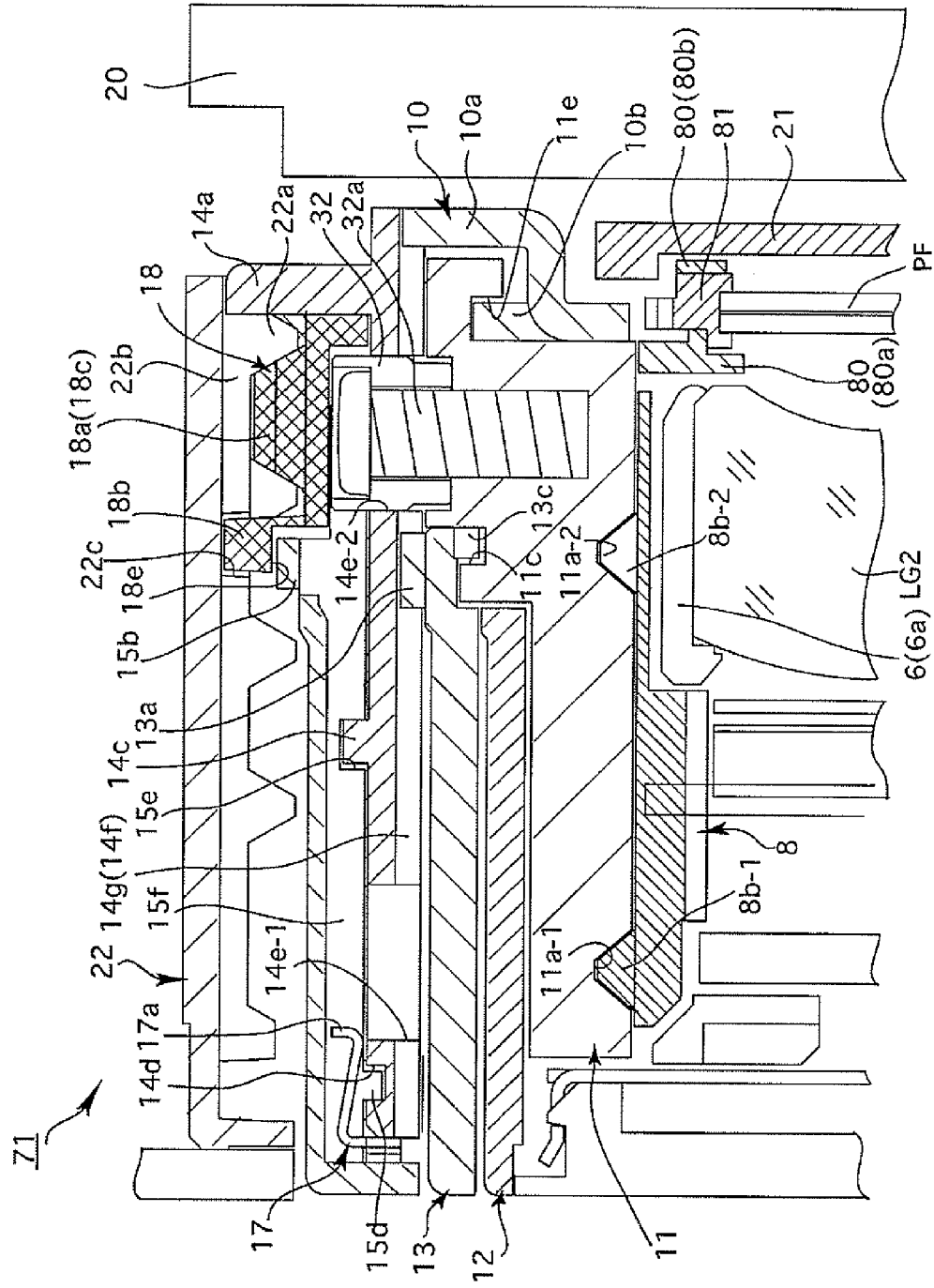
FIG. 5 is an enlarged sectional view of a portion of the zoom lens shown in FIG. 2, in which the zoom lens is in the fully-retracted state.
Figure 6:
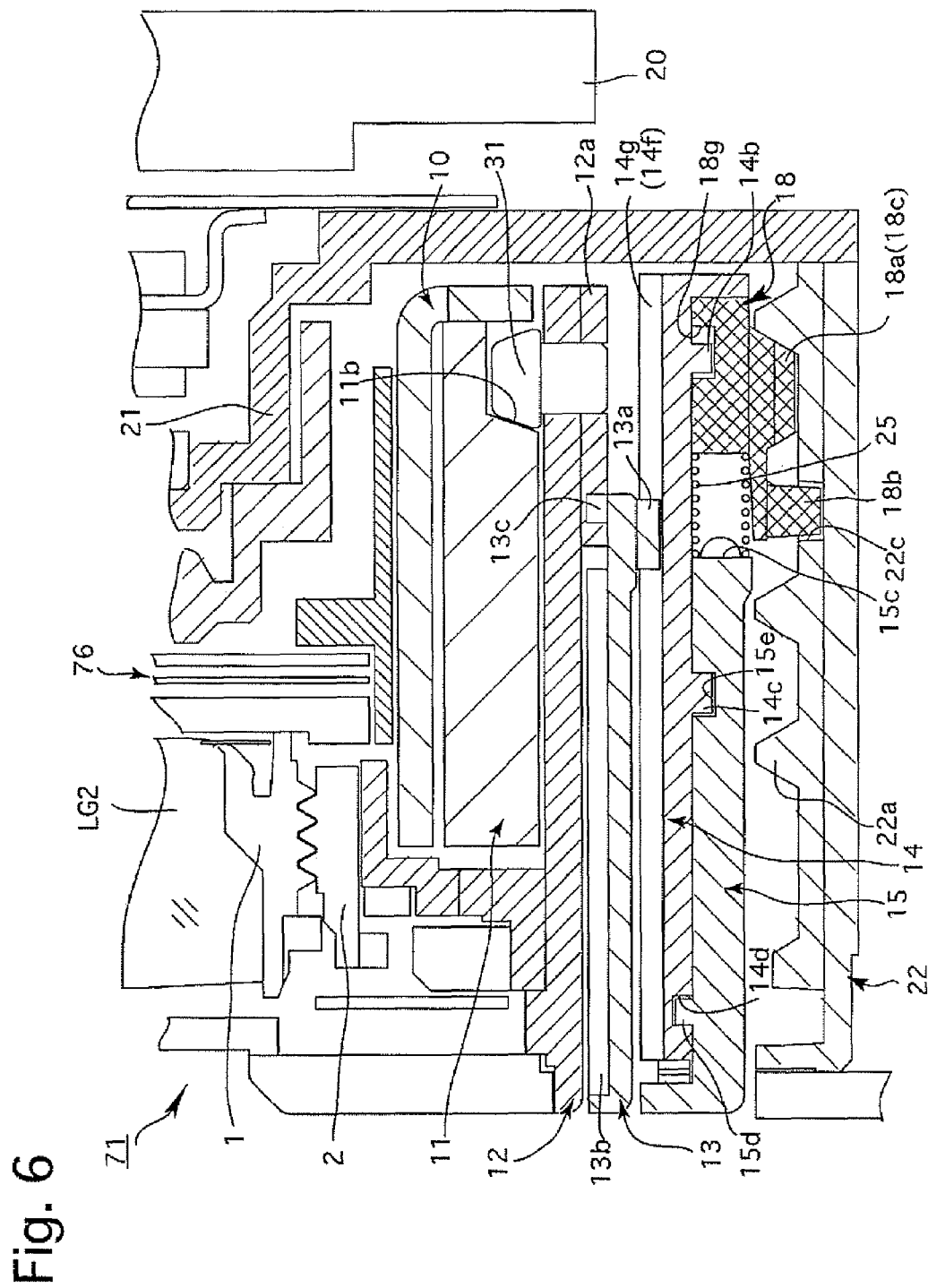
FIG. 6 is an enlarged sectional view of another portion of the zoom lens shown in FIG. 2, in which the zoom lens is in the fully-retracted state.
Figure 10:
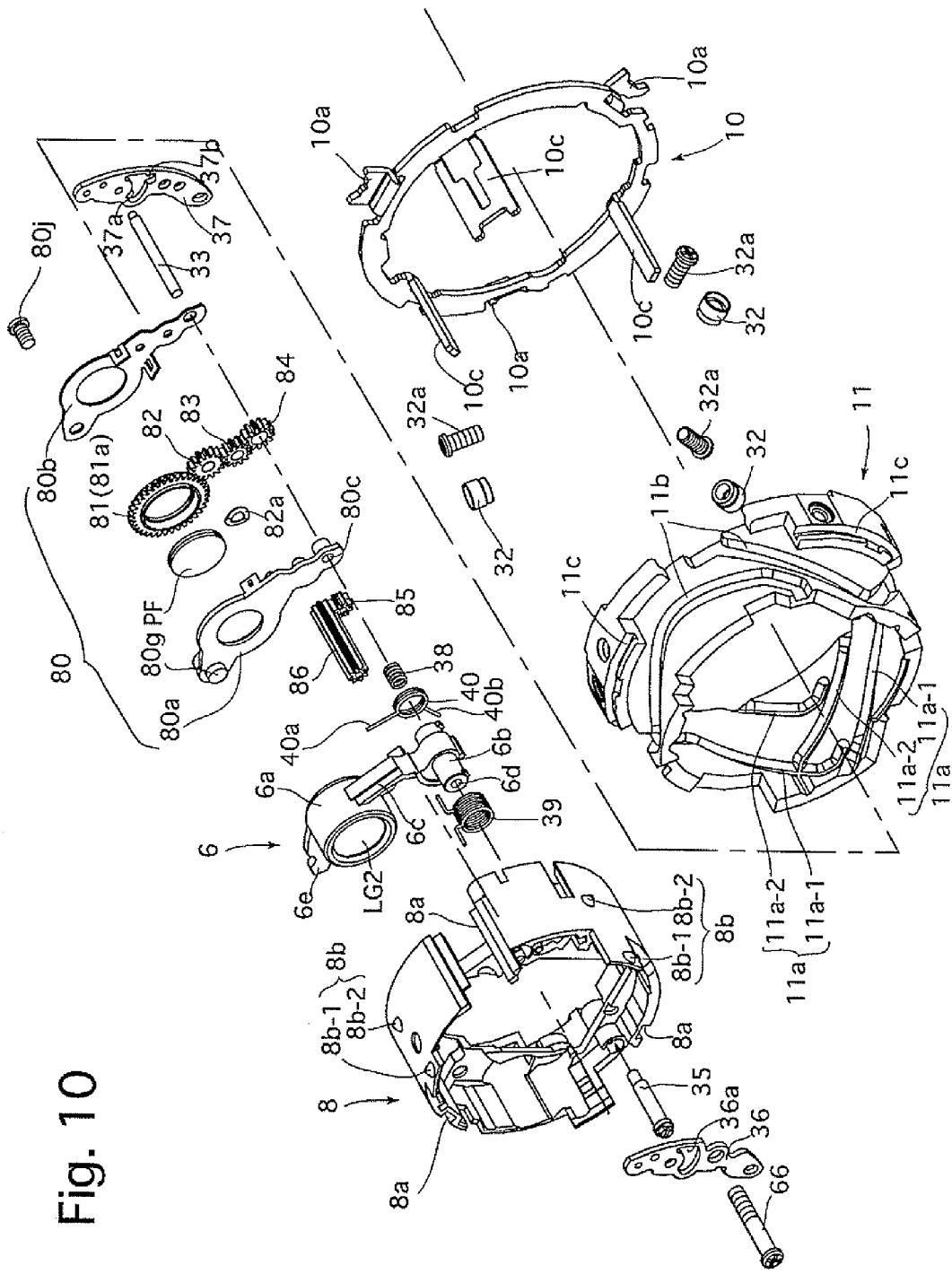
FIG. 10 is an exploded perspective view of portions of the zoom lens shown in FIG. 8A, showing elements of a support mechanism for supporting the second lens group and a polarizing filter of the zoom lens.

As shown in FIGS. 10 and 20, the second linear guide ring 10, that guides the second lens group LG2 linearly, is provided on the ring portion 10b with a set of three linear guide keys 10c which project forward in parallel to one another from the ring portion 10b. The second lens group moving frame 8 is provided with a corresponding set of three guide grooves 8a (see FIGS. 10 and 21) in which the set of three linear guide keys 10c are engaged, respectively. As shown in FIGS. 3 and 5, a discontinuous outer edge of the ring portion 10b is engaged in a discontinuous circumferential groove 11e formed on an inner peripheral surface of the cam ring 11 at the rear end thereof to be rotatable about the lens barrel axis Z0 relative to the cam ring 11 and to be immovable relative to the cam ring 11 in the optical axis direction. The set of three linear guide keys 10c project forward from the ring portion 10b to be positioned inside the cam ring 11. Opposite edges of each linear guide key 10c extending in an axial direction of the second linear guide ring 10 serve as parallel guide edges which are respectively engaged with opposed guide surfaces in the associated guide groove 8a of the second lens group moving frame 8, which is positioned in the cam ring 11 to be supported thereby, to guide the second lens group moving frame 8 linearly in the optical axis direction without rotating the same about the lens barrel axis Z0.

Figure 17:
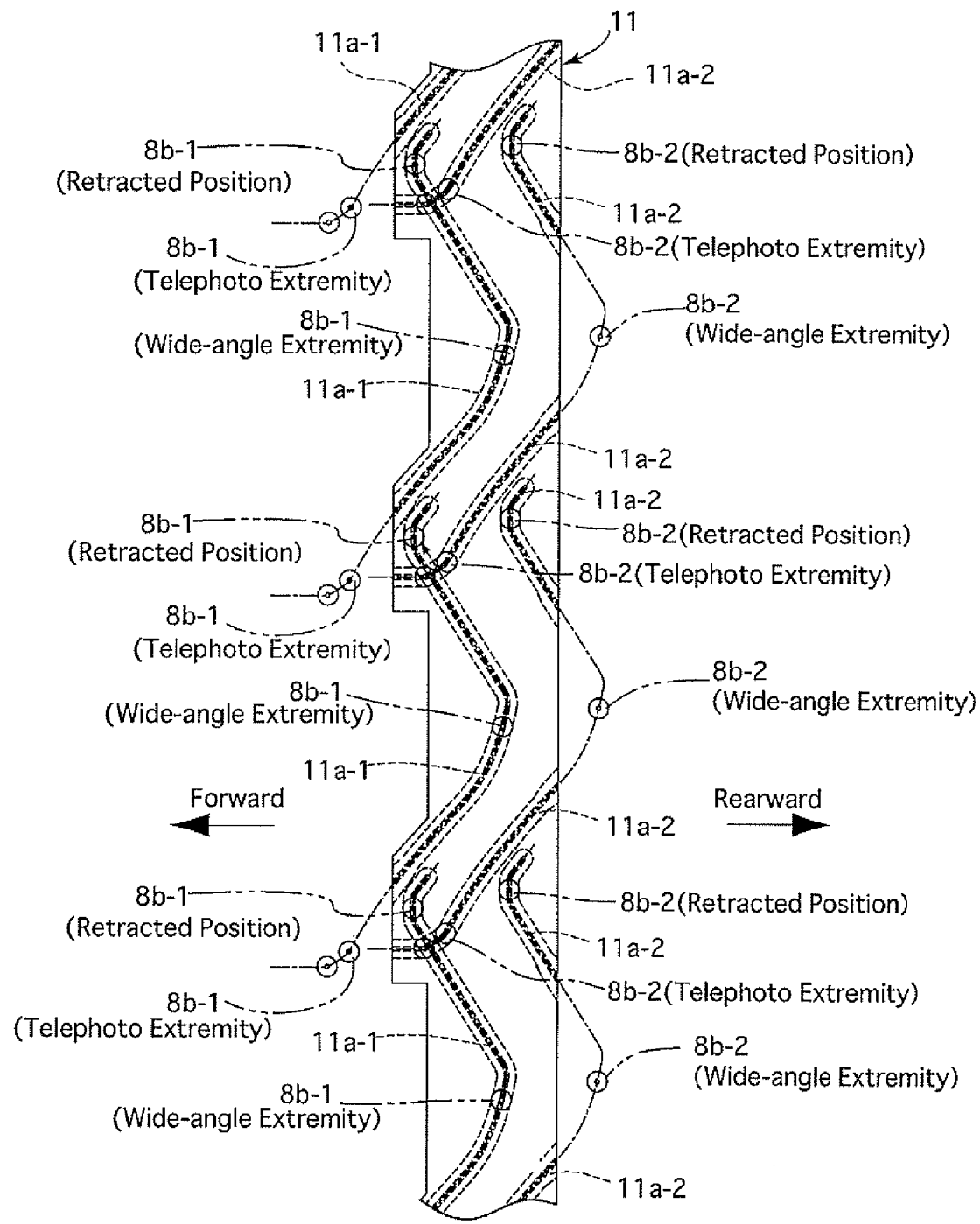
FIG. 17 is a developed view of the cam ring shown in FIG. 10, showing inner cam grooves (for moving the second lens group), formed on the inner peripheral surface of the cam ring, by broken lines.

The cam ring 11 is provided on an inner peripheral surface thereof with a plurality of inner cam grooves 11a for moving the second lens group LG2. As shown in FIG. 17, the plurality of inner cam grooves 11a include a set of three front inner cam grooves 11a-1 formed at different circumferential positions, and a set of three rear inner cam grooves 11a-2 formed at different circumferential positions behind the set of three front inner cam grooves 11a-1. Each rear inner cam groove 11a-2 is formed on the cam ring 11 as a discontinuous cam groove (see FIG. 17). The second lens group moving frame 8 is provided on an outer peripheral surface thereof with a plurality of cam followers 8b. As shown in FIG. 21, the plurality of cam followers 8b include a set of three front cam followers 8b-1 which are formed at different circumferential positions to be respectively engaged in the set of three front inner cam grooves 11a-1, and a set of three rear cam followers 8b-2 which are formed at different circumferential positions behind the set of three front cam followers 8b-1 to be respectively engaged in the set of three rear inner cam grooves 11a-2. A rotation of the cam ring 11 causes the second lens group moving frame 8 to move in the optical axis direction in a predetermined moving manner in accordance with contours of the plurality of inner cam grooves 11a since the second lens group moving frame 8 is guided linearly in the optical axis direction without rotating via the second linear guide ring 10.

The zoom lens 71 is provided inside the second lens group moving frame 8 with a second lens frame (removable optical element holding frame) 6 which supports and holds the second lens group LG2. As shown in FIG. 10, the second lens frame 6 is provided with a cylindrical lens holder portion 6a, a pivoted cylindrical portion 6b, a swing arm portion 6c and an engaging protrusion (stop protrusion) 6e. The cylindrical lens holder portion 6a directly holds and supports the second lens group L2. The pivoted cylindrical portion 6b is provided on the axis thereof with a through-hole 6d which extends in a direction parallel to the optical axis of the second lens group LG2. The swing arm portion 6c extends in a radial direction of the cylindrical lens holder portion 6a to connect the cylindrical lens holder portion 6a to the pivoted cylindrical portion 6b. The engaging protrusion 6e is formed on the cylindrical lens holder portion 6a to extend radially outwards in a direction away from the swing arm portion 6c. The engaging protrusion 6e is provided on a rear surface thereof with a stop projection (an element of a forced removing device/ holding-frame linkage portion/ contactable portion) 6f (see FIGS. 25, 26, 33 and 34). The cylindrical lens holder portion 6a and the pivoted cylindrical portion 6b of the second lens frame 6 are cylindrical members, the axes of which are parallel to each other and also parallel to the photographing optical axis Z1. In the through-hole 6d of the pivoted cylindrical portion 6b, a pivot shaft 33 is fitted so that the second lens frame 6 can rotate about the pivot shaft 33. The front and rear ends of the pivot shaft 33 are supported by front and rear second lens frame support plates (a pair of second lens frame support plates) 36 and 37, respectively. The pair of second lens frame support plates 36 and 37 are fixed to the second lens group moving frame 8 by a set screw 66. Accordingly, the second lens frame 6 is supported by the second lens group moving frame 8 to be rotatable (swingable) about the pivot shaft 33. The pivot shaft 33 is a predetermined distance away from the photographing optical axis Z1 and extends parallel to the photographing optical axis Z1. The second lens frame 6 is swingable about the pivot shaft 33 between a photographing position (shown in FIGS. 1, 25 through 28, 33 and 34) where the optical axis of the second lens group LG2 coincides with the photographing optical axis Z1 and a radially retracted position (shown in FIGS. 2, 29 and 30) where the optical axis of the second lens group LG2 is retracted away from the photographing optical axis Z1 to be eccentric from the photographing optical axis Z1. As shown in FIGS. 25 through 30, a rotation limit shaft (removable-frame positioning device) 35 which determines the aforementioned photographing position of the second lens frame 6 by making contact with the engaging protrusion 6e is mounted to the second lens group moving frame 8. A second lens frame returning spring (front torsion coil spring) 39 (see FIG. 10) is fitted on a front portion of the pivoted cylindrical portion 6b to bias the second lens frame 6 to rotate in a direction to bring the engaging protrusion 6e to come into contact with the rotation limit shaft 35, i.e., in a direction toward the aforementioned photographing position of the second lens frame 6. An axial-direction biasing spring 38 made of a compression coil spring is fitted on the pivot shaft 33 to press the pivoted cylindrical portion 6b forward in the optical axis direction (toward the rear second lens frame support plate 36) to thereby remove backlash of the second lens frame 6 relative to the second lens group moving frame 8 in the optical axis direction.

The second lens frame 6 moves together with the second lens group moving frame 8 in the optical axis direction. The CCD holder 21 is provided on a front surface thereof with a position-control cam bar (removing device) 19 (see FIG. 11) which projects forward from the CCD holder 21 to be engageable with the second lens frame 6. If the second lens group moving frame 8 moves rearward in a retracting direction to approach the CCD holder 21, the position-control cam bar 19 comes into pressing contact with the second lens frame 6 to rotate the second lens frame 6 to the radially retracted position thereof against the biasing force of the second lens frame returning spring 39 (see FIGS. 29 and 30).

More specifically, as shown in FIGS. 25 through 30, the position-control cam bar 19 is provided at a front end thereof with a retracting cam surface 19a which is inclined with respect to the optical axis direction, and is further provided, along an inner side edge of the position-control cam bar 19 that is communicably connected with the retracting cam surface 19a, with a radially-retracted-position holding surface 19b which extends rearward from the retracting cam surface 19a in the optical axis direction. The position-control cam bar 19 is in the shape of a partial cylinder having its axis on the axis of the pivot shaft 33, thus having a curved shape in cross section. The retracting cam surface 19a is formed on an end surface of the partial cylinder as a lead surface. The retracting cam surface 19a is formed as an inclined surface which is inclined forward in a direction away from the photographing optical axis Z1. The position-control cam bar 19 is provided on a lower surface (convex surface) thereof with a guide key 19c which is elongated in the optical axis direction. The front and rear second lens frame support plates 36 and 37 are provided with a cam-bar insertable hole 36a and a cam-bar insertable hole 37a, respectively, so that the cam-bar insertable hole 36a and the cam-bar insertable hole 37a are aligned with the position-control cam bar 19 in the optical axis direction. The rear second lens frame support plate 37 is further provided in a portion of the cam-bar insertable hole 37a with a guide key insertable recess 37b which allows the guide key 19c to enter therethrough.

A rotation transfer spring (rear torsion coil spring) 40 that is independent of the second lens frame returning spring 39 is fitted on a rear portion of the pivoted cylindrical portion 6b. The rotation transfer spring 40 is provided at opposite ends thereof with a stationary spring end 40a and a movable spring end 40b, respectively. The stationary spring end 40a is fixed to the swing arm portion 6c, and the movable spring end 40b stays at a position which is exposed to the rear of the second lens group moving frame 8 through the cam-bar insertable hole 37a (the movable spring end 40b stays in front of the position-control cam bar 19) when the second lens frame 6 is in the aforementioned photographing position thereof (see FIG. 25).

Figure 28:
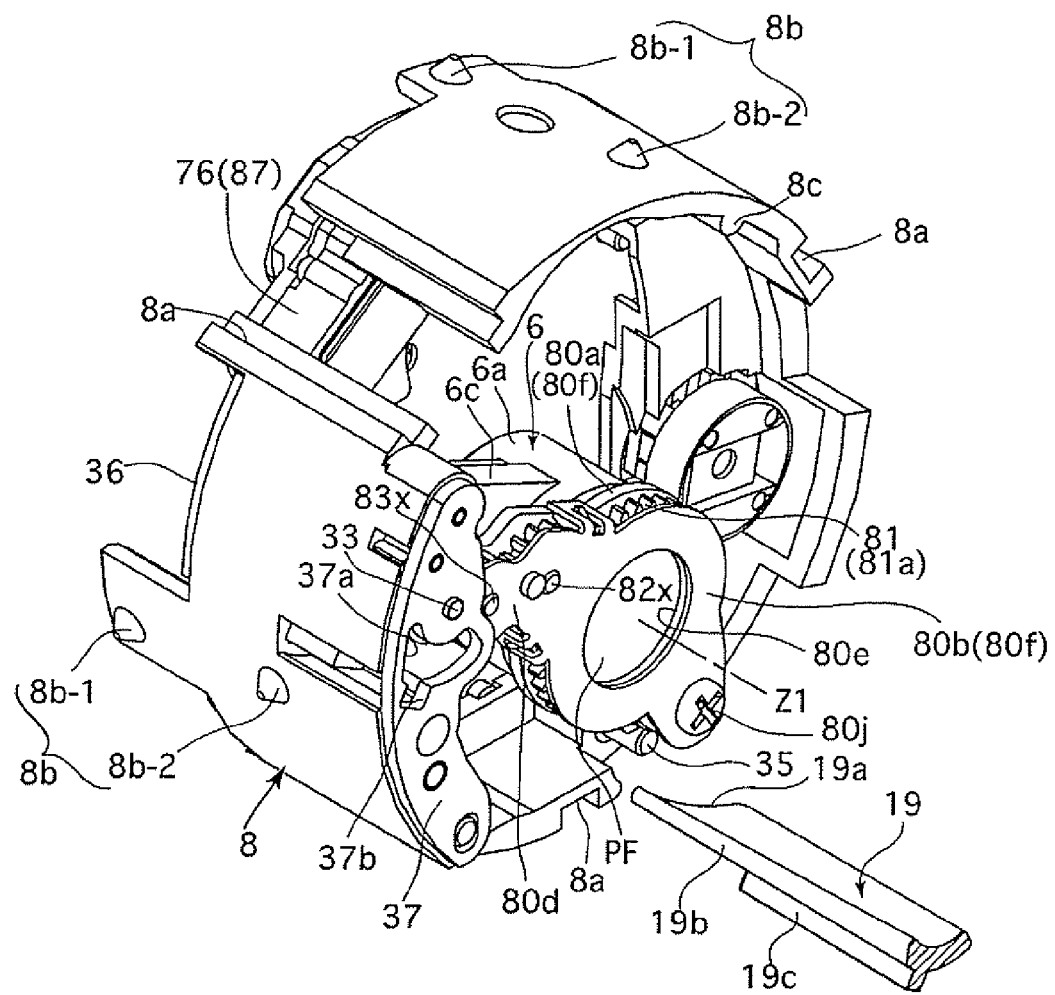
FIG. 28 is a view similar to that of FIG. 27, showing the elements shown in FIG. 27 in addition to the second lens group moving frame shown in FIGS. 10 and 21.
Figure 29:
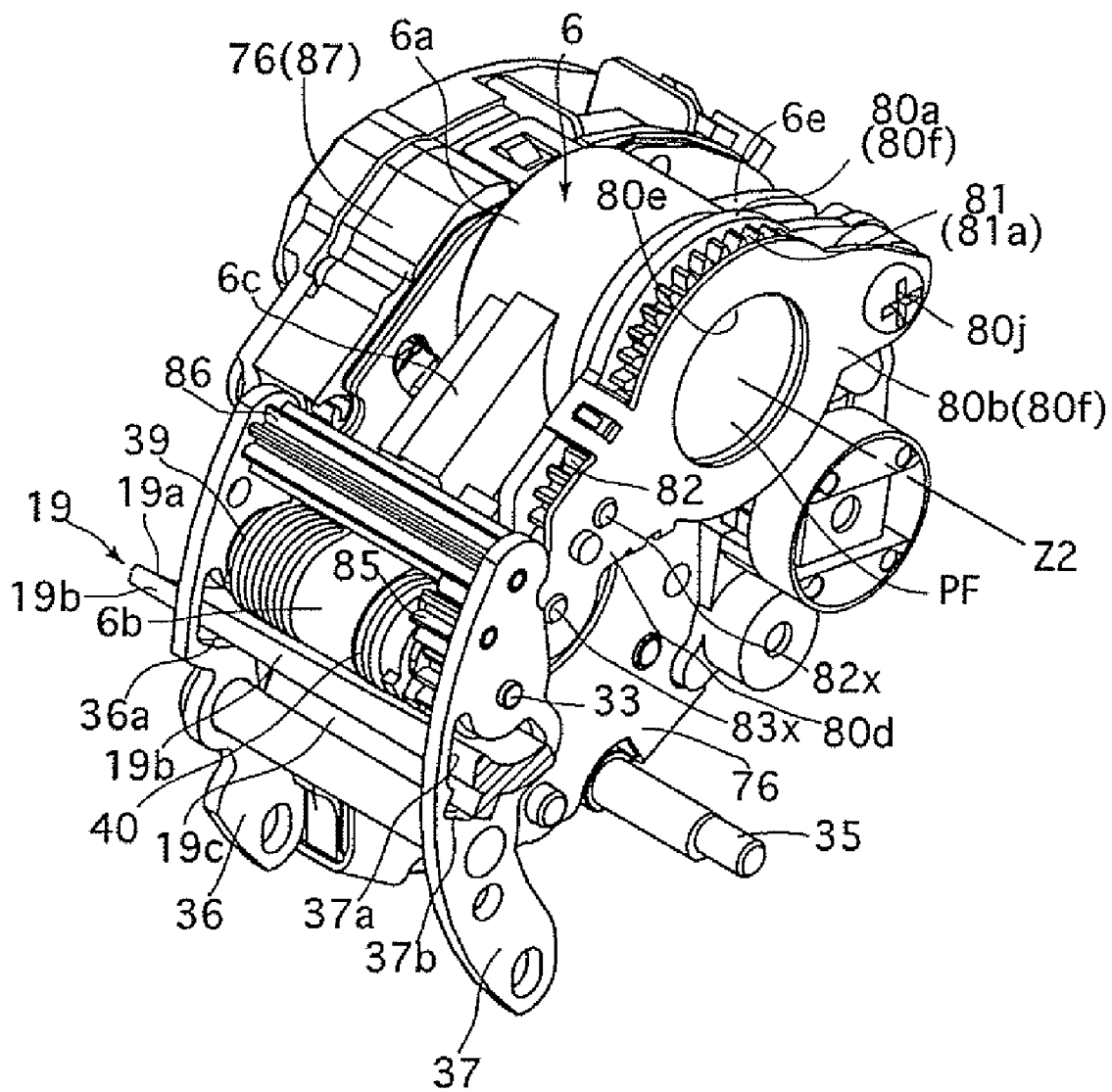
FIG. 29 is a view similar to that of FIG. 25, showing elements shown in FIG. 25 in a state where the zoom lens is in the fully-retracted state and where both the second lens group and the polarizing filter are in the radially retracted positions thereof, viewed obliquely from the rear of the zoom lens.
Figure 30:
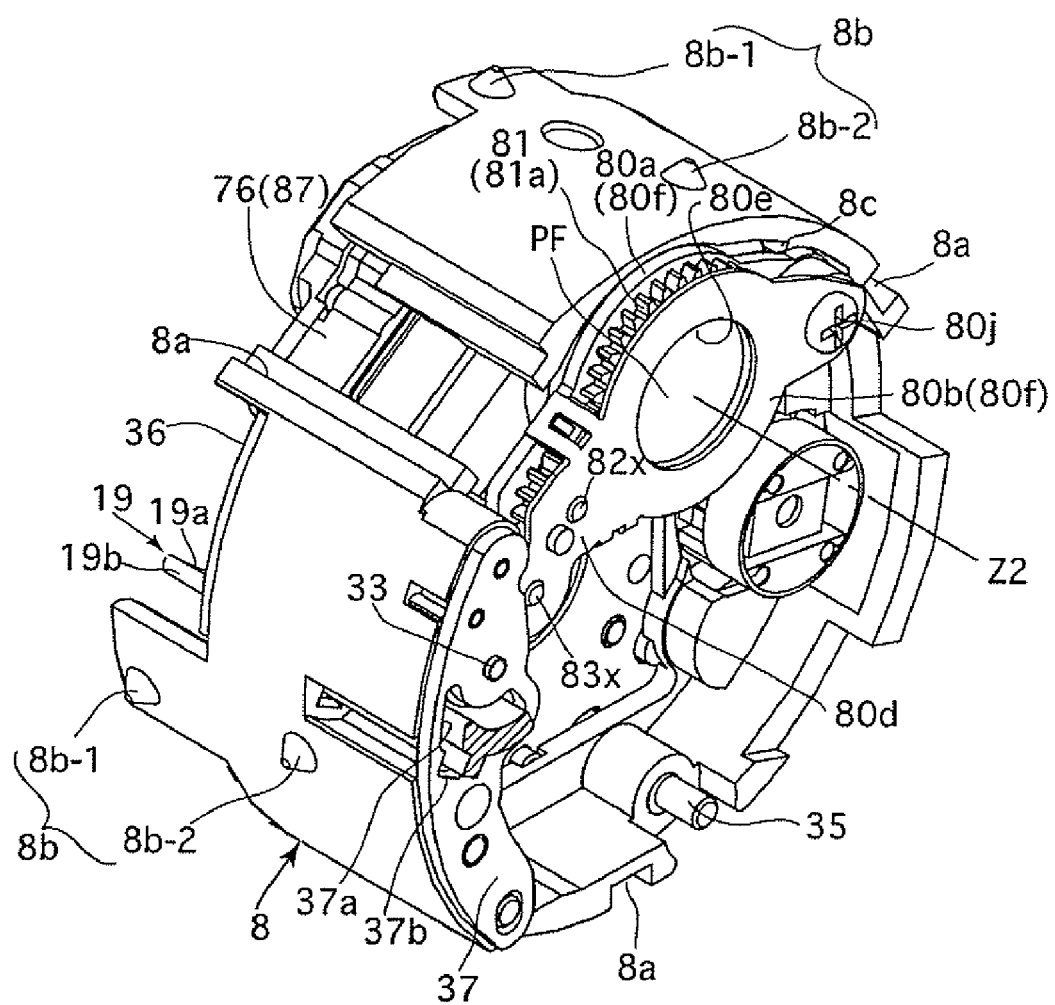
FIG. 30 is a view similar to that of FIG. 29, showing the elements shown in FIG. 29 in addition to the second lens group moving frame shown in FIGS. 10 and 21.
Figure 31:
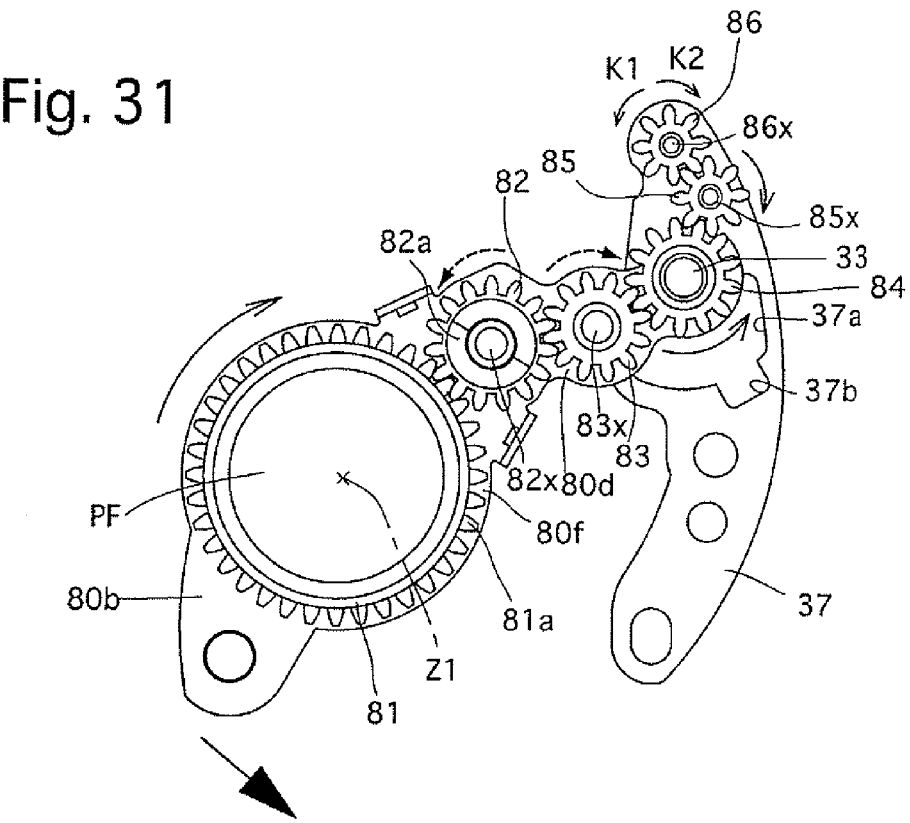
FIG. 31 is a front elevational view of the filter driving mechanism in a state where the polarizing filter is in the inserted position, in which the polarizing filter is positioned on the photographing optical axis.

Due to the above described structure, during the course of moving the second lens group moving frame 8 rearward in the optical axis direction to approach the CCD holder 21 when the zoom lens 71 moves from a ready-to-photograph state to the fully-retracted state, the position-control cam bar 19 enters the cam-bar insertable hole 37a of the rear second lens frame support plate 37 (see FIGS. 29 and 30) and the retracting cam surface 19a of the position-control cam bar 19 comes into contact with the movable spring end 40b of the rotation transfer spring 40. A further rearward movement of the second lens frame 6 together with the second lens group moving frame 8 with the rear movable spring end 40b remaining in contact with the retracting cam surface 19a generates a component force in a direction to make the rear movable spring end 40b rotate while sliding on the retracting cam surface 19a in a radial direction of the pivot shaft 33 in accordance with the shape of the retracting cam surface 19a so that the rotation of the rear movable spring end 40b is transferred to the second lens group 6 via the stationary spring end 40a. Upon receiving a turning force from the retracting cam surface 19a via the rotation transfer spring 40, the second lens group 6 rotates about the pivot shaft 33 against the spring force of the second lens frame returning spring 39 from the aforementioned photographing position (shown in FIGS. 1, 25 through 28 and 33 through 34) toward the aforementioned radially retracted position (shown in FIGS. 2, 29 and 30) in accordance with the retracting movement of the second lens group moving frame 8. Upon the second lens frame 6 rotating to the radially retracted position, the rear movable spring end 40b moves from the retracting cam surface 19a to the radially-retracted-position holding surface 19b to be engaged therewith. Thereafter, the second lens frame 6 is not rotated about the pivot shaft 33 in a direction to the radially retracted position even if the second lens group moving frame 8 moves rearward. This rotation of the second lens frame 6 from the photographing position to the radially retracted position is predetermined to be completed before the second lens frame 6 retracts to the position of the AF lens frame 51 that is positioned behind the second lens frame 6 so that the second lens frame 6 and the AF lens frame 51 do not interfere with each other. After the second lens frame 6 reaches the radially retracted position, the second lens group moving frame 8 continues to move rearward until reaching the retracted position shown in FIG. 2. During this rearward movement of the second lens group moving frame 8, the second lens group 6 moves rearward together with the second lens group moving frame 8 with the second lens group 6 held in the radially retracted position, in which the rear movable spring end 40b remains in engaged with the radially-retracted-position holding surface 19b. Upon the zoom lens 71 moving to the fully-retracted state shown in FIG. 2, the position-control cam bar 19 projects forward from the cam-bar insertable hole 36a of the front second lens frame support plate 36 as shown in FIGS. 29 and 30.

When the zoom lens 71 advances from the retracted position shown in FIG. 2 to the ready-to-photograph position shown in FIG. 1, the second lens frame 6 is rotated from the radially retracted position to the photographing position by the biasing force of the second lens frame returning spring 39 upon the second lens frame 6 moving forward to a position in which the engagement of the rear movable spring end 40b of the rotation transfer spring 40 with the retracting cam surface 19a of the position-control cam bar 19 is released. At this time, the engaging protrusion 6e of the second lens frame 6 comes into contact with the rotation limit shaft 35, which determines the limit of rotation of the second lens frame 6 in the biasing direction of the second lens frame returning spring 39. Namely, the second lens frame 6 is held in the photographing position due to the biasing force of the second lens frame returning spring 39 and the engagement of the engaging protrusion 6e with the rotation limit shaft 35.

The spring force (rigidity) of the rotation transfer spring 40 is predetermined to be capable of transferring a torque from the rear movable spring end 40b to the second lens group 6 via the front stationary spring end 40a without the front stationary spring end 40a and the rear movable spring end 40b flexing toward each other. Namely, the resiliency of the rotation transfer spring 40 is determined to be greater than that of the second lens frame returning spring 39 at the time the second lens frame returning spring 39 holds the second lens frame 6 in the photographing position.

Figure 9:
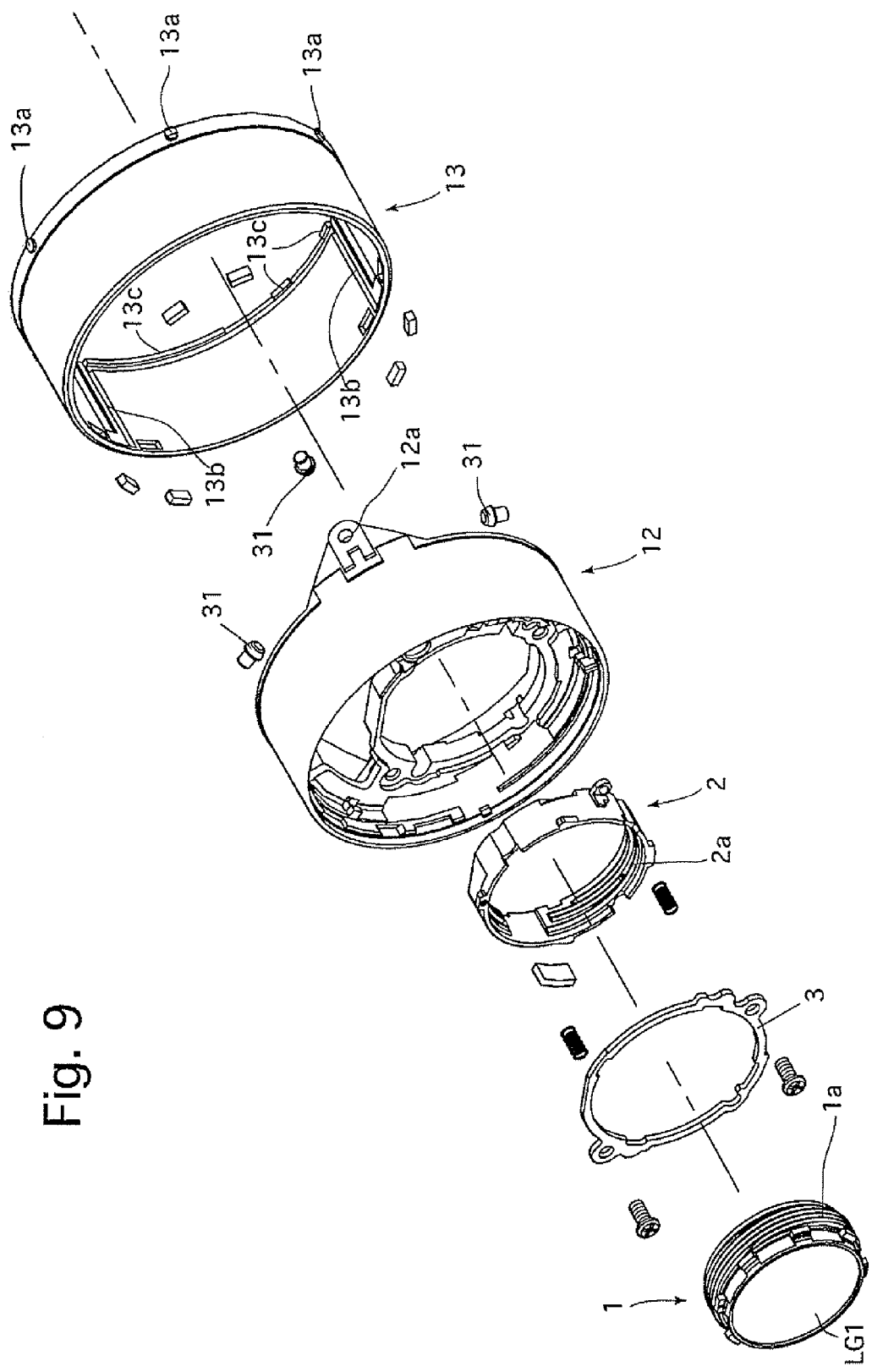
FIG. 9 is an exploded perspective view of portions of the zoom lens shown in FIG. 8A, showing elements of a support mechanism for supporting the first lens group of the zoom lens.
Figure 16:
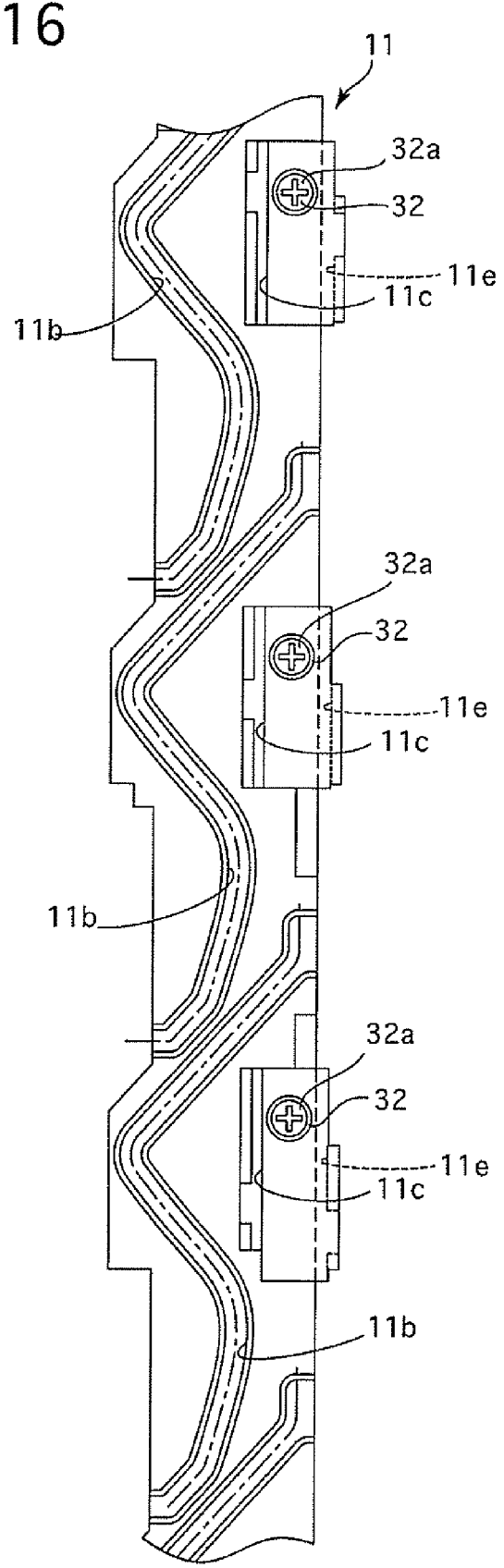
FIG. 16 is a developed view of a cam ring shown in FIG. 10.
Figure 18:
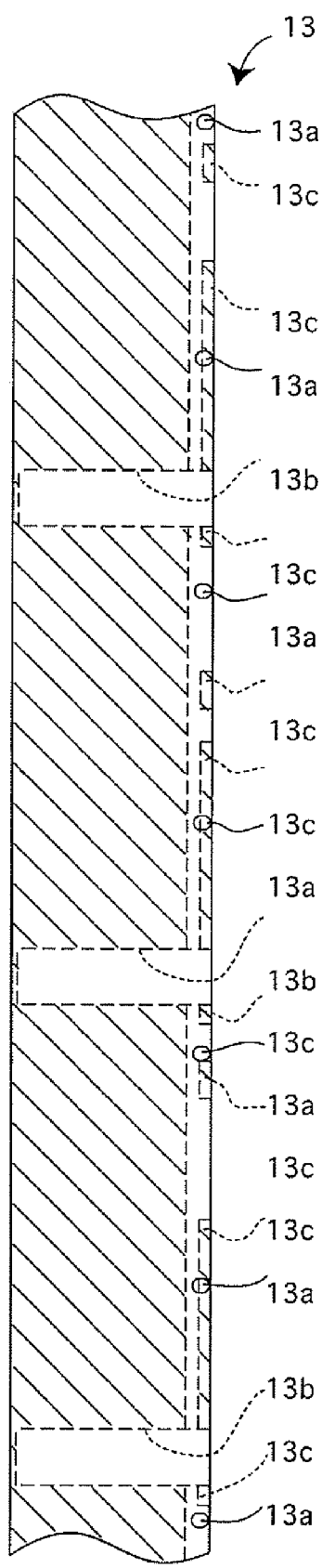
FIG. 18 is a developed view of a second external barrel shown in FIG. 9.
Figure 19:
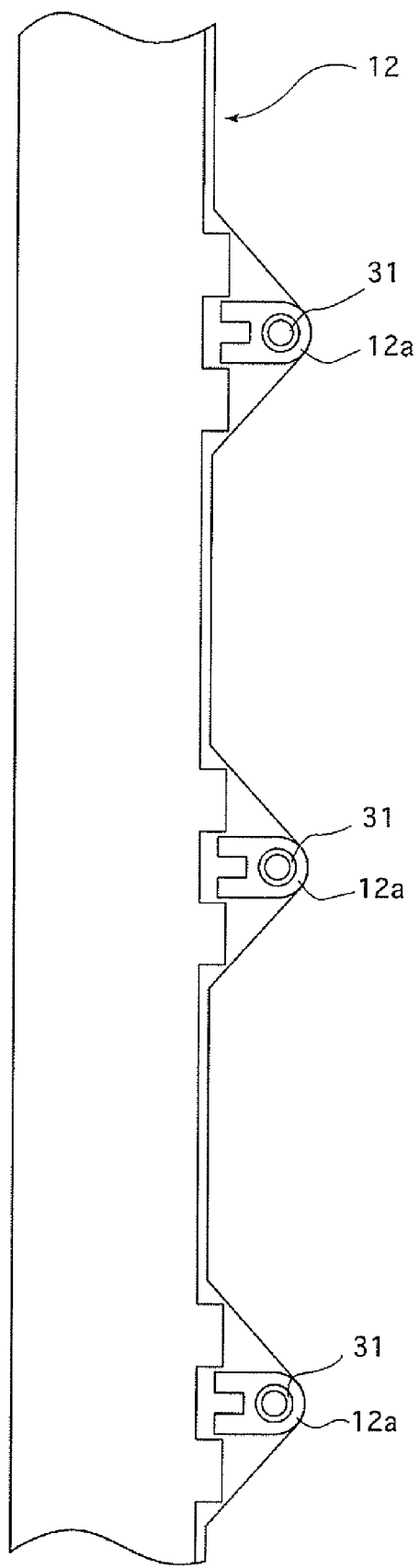
FIG. 19 is a developed view of a first external barrel shown in FIG. 9.

As shown in FIGS. 9 and 18, the second external barrel 13 is provided, on an inner peripheral surface thereof, with a set of three linear guide grooves 13b which are formed at different circumferential positions to extend parallel to one another in the optical axis direction. The first external barrel 12 is provided on an outer peripheral surface at the rear end thereof with a set of three engaging protrusions 12a which are slidably engaged in the set of three linear guide grooves 13b, respectively. Accordingly, the first external barrel 12 is guided linearly in the optical axis direction without rotating via the first linear guide ring 14 and the second external barrel 13. The second external barrel 13 is further provided on an inner peripheral surface thereof in the vicinity of the rear end of the second external barrel 13 with a discontinuous inner flange 13c which extends in a circumferential direction of the second external barrel 13. The cam ring 11 is provided on an outer peripheral surface thereof with a discontinuous circumferential groove 11c in which the discontinuous inner flange 13c is slidably engaged so that the cam ring 11 is rotatable about the lens barrel axis Z0 relative to the second external barrel 13 and so that the second external barrel 13 is not relatively movable in the optical axis direction to the cam ring 11. On the other hand, the first external barrel 12 is provided on an inner peripheral surface thereof with a set of three cam followers 31 which project radially inwards, and the cam ring 11 is provided on an outer peripheral surface thereof with a set of three outer cam grooves 11b (cam grooves for moving the first lens group LG1; see FIGS. 10 and 16) in which the set of three cam followers 31 are slidably engaged, respectively.

The zoom lens 71 is provided inside the first external barrel 12 with a first lens frame 1 which is supported by the first external barrel 12 via a first lens group adjustment ring 2. As shown in FIGS. 1, 2 and 9, the first lens group LG1 is supported by the first lens frame 1 to be fixed thereto. The first lens frame 1 is provided on an outer peripheral surface thereof with a male screw thread (adjusting screw thread) 1a, and the first lens group adjustment ring 2 is provided on an inner peripheral surface thereof with a female screw thread (adjusting screw thread) 2a which is engaged with the male screw thread 1a. The axial position of the first lens frame 1 relative to the first lens group adjustment ring 2 can be adjusted via the male screw thread 11a and the female screw thread 2a. A combination of the first lens frame 1 and the first lens group adjustment ring 2 is positioned inside of the first external barrel 12 to be supported thereby and to be movable in the optical axis direction relative to the first external barrel 12. The zoom lens 71 is provided in front of the first external barrel 12 with a fixing ring 3 which is fixed to the first external barrel 12 by set screws to prevent the first lens group adjustment ring 2 from moving forward and coming off the first external barrel 12.

The zoom lens 71 is provided between the first and second lens groups LG1 and LG2 with a shutter unit 76 including the shutter S and the adjustable diaphragm A. The shutter unit 76 is positioned in the second lens group moving frame 8 to be fixed thereto.

Operations of the zoom lens 71 that has the above described structure will be discussed hereinafter. The stage at which the cam ring 11 is driven to advance from the fully-retracted position shown in FIG. 2 to the position where the cam ring 11 rotates at the axial position without moving in the optical axis direction has been discussed above, and will be briefly discussed hereinafter. In the state shown in FIG. 2, in which the zoom lens 71 is in the retracted state, the zoom lens 71 is fully accommodated in the camera body 72. Upon a main switch 73 (see FIG. 22) provided on an outer surface of the digital camera 70 being turned ON in the fully-retracted state of the zoom lens 71 shown in FIG. 2, the zoom motor 150 is driven to rotate in a lens barrel advancing direction by control of a control circuit 75 (see FIG. 22) provided in the camera body 72. This rotation of the zoom motor 150 rotates the zoom gear 28. At the same time, this rotation of the zoom gear 28 causes a combination of the helicoid ring 18 and the third external barrel 15 to move forward while rotating about the lens barrel axis Z0 due to the engagement of the female helicoid 22a with the male helicoid 18a, and further causes the first linear guide ring 14 to move forward together with the third external barrel 15 and the helicoid ring 18. At this time, the cam ring 11 which rotates by rotation of the third external barrel 15 moves forward in the optical axis direction by an amount of movement corresponding to the sum of the amount of the forward movement of the first linear guide ring 14 and the amount of the forward movement of the cam ring 11 by a leading structure between the cam ring 11 and the first linear guide ring 14, i.e., by the engagement of the set of three roller followers 32 with the lead slot portions 14e-3 of the set of three through-slots 14e, respectively. Once the helicoid ring 18 and the cam ring 11 advance to respective predetermined positions thereof, the male helicoid 18a is disengaged from the female helicoid 22a while the set of three roller followers 32 are disengaged from the lead slot portions 14e-3 to enter the front circumferential slot portions 14e-1, respectively. Consequently, each of the helicoid ring 18 and the cam ring 11 rotates about the lens barrel axis Z0 without moving in the optical axis direction.

A rotation of the cam ring 11 causes the second lens group moving frame 8, which is positioned inside the cam ring 11 and guided linearly in the optical axis direction via the second linear guide ring 10, to move in the optical axis direction with respect to the cam ring 11 in a predetermined moving manner due to the engagement of the set of three front cam followers 8b-1 with the set of three front inner cam grooves 11a-1 and the engagement of the set of three rear cam followers 8b-2 with the set of three rear inner cam grooves 11a-2, respectively. In the state shown in FIG. 2, in which the zoom lens 71 is in the fully-retracted state, the second lens frame 6, which is positioned inside of the second lens group moving frame 8, has rotated about the pivot shaft 33 to be held in the radially retracted position above the photographing optical axis Z1 by the action of the position-control cam bar 19 so that the optical axis of the second lens group LG2 moves from the photographing optical axis Z1 to a retracted optical axis Z2 positioned above the photographing optical axis Z1. During the course of movement of the second lens group moving frame 8 from the retracted position to a position in the zooming range, the second lens frame 6 is disengaged from the position-control cam bar 19 to rotate about the pivot shaft 33 from the radially retracted position to the photographing position shown in FIG. 1, so that the optical axis of the second lens group LG2 coincides with the photographing optical axis Z1, by the spring force of the second lens frame returning spring 39. Thereafter, the second lens frame 6 remains held in the photographing position until the zoom lens 71 is retracted into the camera body 72.

In addition, a rotation of the cam ring 11 causes the first external barrel 12, which is positioned around the cam ring 11 and guided linearly in the optical axis direction without rotating about the lens barrel axis Z0, to move in the optical axis direction relative to the cam ring 11 in a predetermined moving manner due to the engagement of the set of three cam followers 31 with the set of three outer cam grooves 11b, respectively.

Accordingly, an axial position of the first lens group LG1 relative to an imaging plane (a light-sensitive surface of the CCD image sensor 60) when the first lens group LG1 is moved forward from the retracted position is determined by the sum of the amount of forward movement of the cam ring 11 relative to the stationary barrel 22 and the amount of forward movement of the first external barrel 12 relative to the cam ring 11, and an axial position of the second lens group LG2 relative to the imaging plane when the second lens group LG2 is moved forward from the retracted position is determined by the sum of the amount of forward movement of the cam ring 11 relative to the stationary barrel 22 and the amount of forward movement of the second lens group moving frame 8 relative to the cam ring 11. A zooming operation is carried out by moving the first and second lens groups LG1 and LG2 on the photographing optical axis Z1 while changing the air distance therebetween. When the zoom lens 71 is driven to advance from the fully-retracted position shown in FIG. 2, the zoom lens 71 firstly moves into a state shown below the photographing lens axis Z1 in FIG. 1 in which the zoom lens 71 is at the wide-angle extremity. Subsequently, the zoom lens 71 moves into the state shown above the photographing lens axis Z1 in FIG. 1 in which the zoom lens 71 is at the telephoto extremity by a further rotation of the zoom motor 150 in a lens barrel advancing direction thereof. As can be seen from FIG. 1, the distance between the first and second lens groups LG1 and LG2 when the zoom lens 71 is at the wide-angle extremity is greater than that of when the zoom lens 71 is at the telephoto extremity. When the zoom lens 71 is at the telephoto extremity as shown above the photographing lens axis Z1 in FIG. 1, the first and second lens groups LG1 and LG2 have moved toward each other so as to have a distance therebetween which is smaller than the distance thereof when the zoom lens 71 is at the wide-angle extremity. This variation of the distance between the first and second lens groups LG1 and LG2 for zooming operation is achieved by contours of the plurality of inner cam grooves 11a (11a-1 and 11a-2) and the set of three outer cam grooves 11b. In the zooming range between the wide-angle extremity and the telephoto extremity, the cam ring 11, the third external barrel 15 and the helicoid ring 18 rotate at their respective axial positions, i.e., without moving in the optical axis direction.

When the first through third lens groups LG1, LG2 and LG3 are in the zooming range, a focusing operation is carried out by moving the third lens group L3 along the photographing optical axis Z1 by rotation of the AF motor 160 in accordance with an object distance.

Upon the main switch 73 being turned OFF, the zoom motor 150 is driven to rotate in a lens barrel retracting direction so that the zoom lens 71 operates in the reverse manner to the above described advancing operation to fully retract the zoom lens 71 into the camera body 72 as shown in FIG. 2. During the course of this retracting movement of the zoom lens 71, the second lens frame 6 rotates about the pivot shaft 33 to the radially retracted position by the position-control cam bar 19 while moving rearward together with the second lens group moving frame 8. When the zoom lens 71 is fully retracted into the camera body 72, the second lens group LG2 is retracted into the space radially outside the space in which the third lens group LG3, the low-pass filter LG4 and the CCD image sensor 60 are retracted as shown in FIG. 2, i.e., the second lens group LG2 is radially retracted into an axial range substantially identical to an axial range in the optical axis direction in which the third lens group LG3, the low-pass filter LG4 and the CCD image sensor 60 are positioned. This structure of the digital camera 70 for retracting the second lens group LG2 in this manner reduces the length of the zoom lens 71 when the zoom lens 71 is fully retracted, thus making it possible to reduce the thickness of the camera body 72 in the optical axis direction, i.e., in the horizontal direction as viewed in FIG. 2.

As mentioned above, the zoom lens 71 is further provided, between the second lens group LG2 and the third lens group LG3 in a ready-to-photograph state of the zoom lens 71, with the polarizing filter PF that can be inserted into and removed from a photographing optical path between the second lens group LG2 and the third lens group LG3. The polarizing filter PF is held by an insertable/retractable filter holding frame (insertable optical element holding frame) 80 which is rotatable about the pivot shaft 33, about which the second lens frame 6 is rotatable. Moreover, the polarizing filter PF is supported by the insertable/retractable filter holding frame 80 so that the polarizing filter PF is rotatable about the axis thereof relative to the insertable/retractable filter holding frame 80. The drive mechanism (insertable-optical-element drive mechanism) for the polarizing filter PF will be discussed hereinafter.

Figure 23:
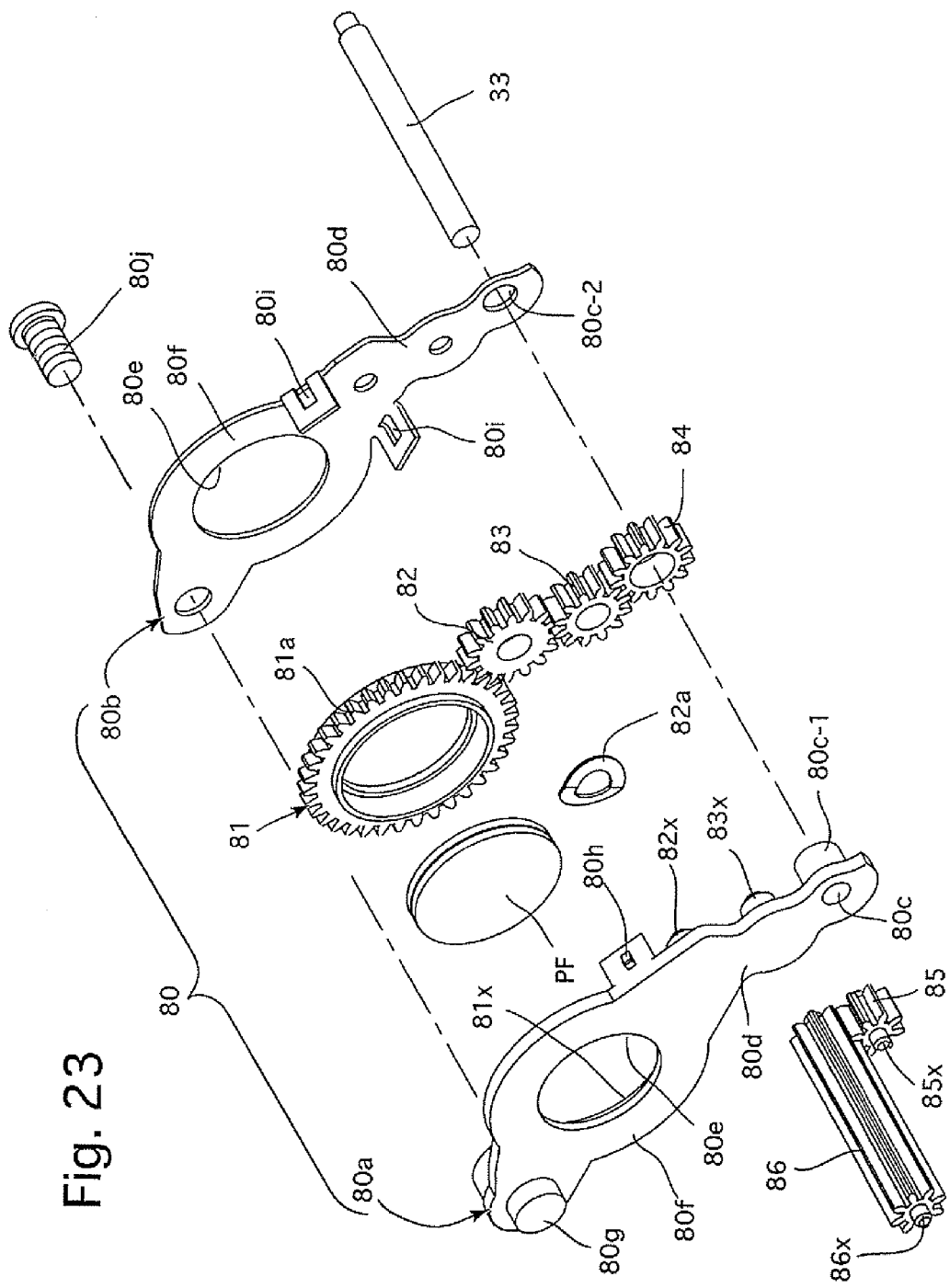
FIG. 23 is an exploded perspective view of a mechanism shown in FIG. 10 provided for driving the polarizing filter.

As shown in FIG. 23, the insertable/retractable filter holding frame 80 includes a front support plate 80a and a rear support plate 80b. The front support plate 80a is provided at one end thereof with a pivot shaft insertion hole 80c which is fitted on the pivot shaft 33 to be freely rotatable relative thereto. The front support plate 80a is provided on the rear thereof with a hollow cylindrical projection 80c-1, the axial hole of which is coincident with the pivot shaft insertion hole 80c. The rear support plate 80b is provided, at a position thereon which faces the pivot shaft insertion hole 80c in the optical axis direction, with a circular hole 80c-2. Each of the front support plate 80a and the rear support plate 80b is provided with a swingable arm 80d and a filter holding portion 80f. The swingable arm 80d extends in a radial direction of the pivot shaft insertion hole 80c, and the filter holding portion 80f is integral with the swingable arm 80d and includes a circular opening 80e. The front support plate 80a is further provided on the front and the rear thereof with a stop portion (an element of the forced removing device/holding-frame linkage portion/ contactable portion) 80g and a rotation support flange 81x, respectively. The stop portion 80g is positioned at an end of the front support plate 80a which is opposite from the other end thereof at which the pivot shaft insertion hole 80c is formed. The rotation support flange 81x is formed on a rear surface of the front support plate 80a which faces the rear support plate 80b. The rotation support flange 81x is formed in a ring shape which is positioned around the circular opening 80e of the front support plate 80a. The axis of the rotation support flange 81x is parallel to the photographing optical axis Z1. The front support plate 80a is provided on opposite side edges thereof with a pair of rearward projections on which a pair of engaging lugs 80h are formed, respectively, and the rear support plate 80b is provided on opposite side edges thereof with a corresponding pair of forward projections in which a pair of engaging holes 80i are formed, respectively. The front support plate 80a and the rear support plate 80b are fixed to each other by a set screw 80j with the pair of engaging lugs 80h being engaged in the pair of engaging holes 80i, respectively. After the front support plate 80a and the rear support plate 80b are fixed to each other by the set screw 80j in such a manner, the pivot shaft 33 is inserted into the pivot shaft insertion hole 80c and the circular hole 80c-2. Accordingly, the insertable/retractable filter holding frame 80 is supported by the pivot shaft 33 to be rotatable (swingable) about the pivot shaft 33.

Figure 24:
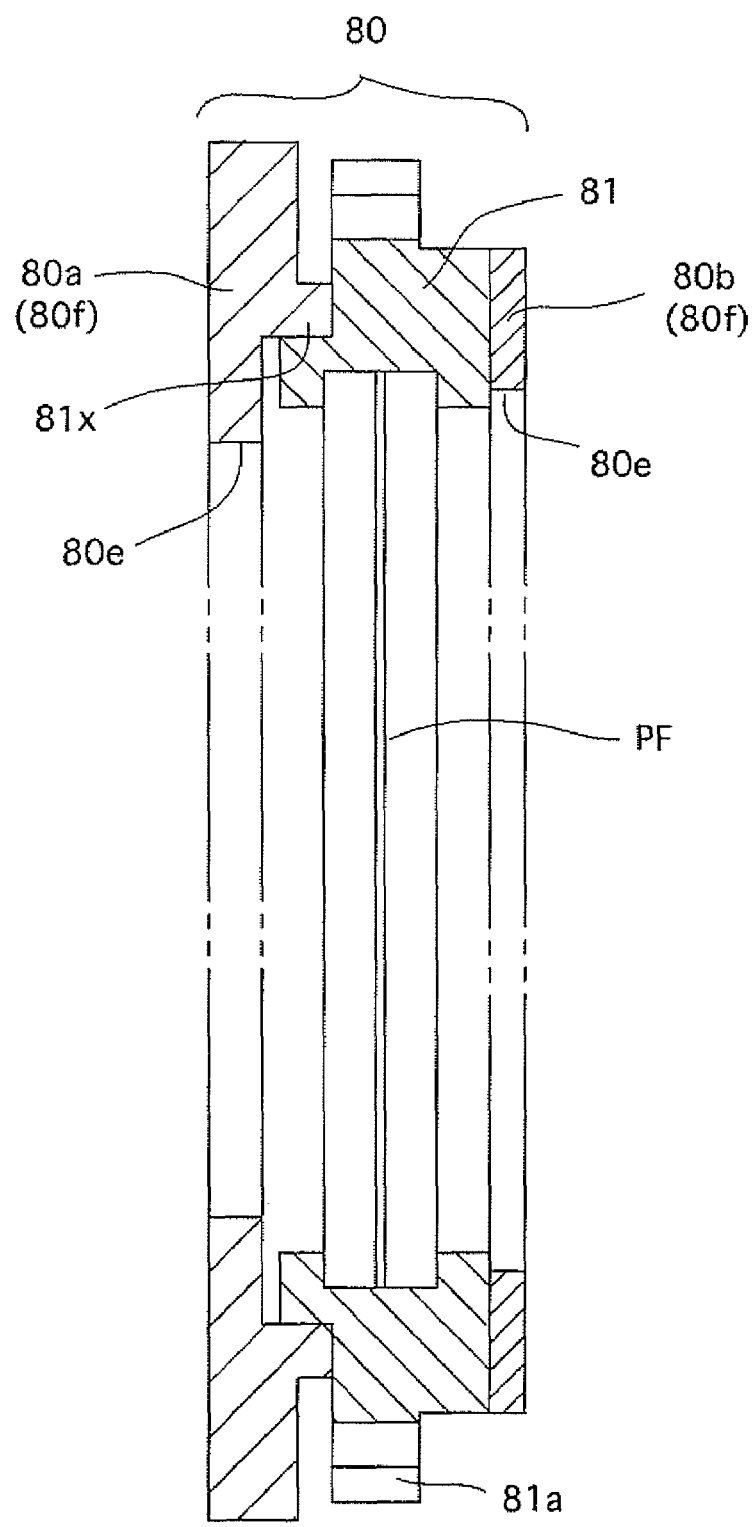
FIG. 24 is a sectional view of an insertable/retractable filter holding frame and a filter holding ring which holds the polarizing filter, taken along a plane orthogonal to the photographing optical axis of the zoom lens.

The polarizing filter PF is held by a filter holding ring 81. As shown in FIG. 24, the filter holding ring 81 is held between the filter holding portions 80f of the front support plate 80a and the rear support plate 80b, and is fitted on the rotation support flange 81x to be freely rotatable thereon. In a state where the filter holding ring 81 is supported by the insertable/retractable filter holding frame 80, the polarizing filter PF is positioned so that front and rear surfaces thereof are exposed to the circular opening 80e of the front support plate 80a and the circular opening 80e of the rear support plate 80b, respectively.

The filter holding ring 81 is provided on the outer edge thereof with a filter gear (spur gear) 81a which is in mesh with a friction gear (spur gear) 82. The friction gear 82 is in mesh with an idle gear (spur gear) 83, and the idle gear 83 is in mesh with a rotation control gear (spur gear) 84. The front support plate 80a is provided on the rear thereof with two rotational pins 82x and 83x each of which projects rearwards, and the friction gear 82 and the idle gear 83 are rotatably fitted on the rotational pins 82x and 83x, respectively. The rotation control gear 84 is rotatably fitted on the cylindrical projection 80c-1. Since the cylindrical projection 80c-1 and the pivot shaft 33 are coaxially arranged, the rotation control gear 84 is driven about the pivot shaft 33. The rotation control gear 84 is in mesh with an idle gear 85 which is in mesh with a drive gear 86. Opposite ends of a rotational shaft 85x of the idle gear 85 are fitted in front and rear bearing holes formed on the second lens group moving frame 8 and the rear second lens frame support plate 37, respectively, to be supported thereby. Likewise, opposite ends of a rotational shaft 86x of the drive gear 86 are fitted in front and rear bearing holes formed on the front and rear second lens frame support plates 36 and 37 to be supported thereby, respectively. Axes of the rotational pin 82x, the rotational pin 83x, the rotational shaft 85x and the rotational shaft 86x are parallel to the photographing optical axis Z1. As mentioned above, the rotation support flange 81x, which serves the axis of rotation of the filter gear 81a (the filter holding ring 81), and the pivot shaft 33, which serves as the axis of rotation of the rotation control gear 84, are also parallel to the photographing optical axis Z1. Therefore, each of all the gears constituting a gear train from the filter gear 11a to the drive gear 86 is driven about an associated axis of rotation parallel to the photographing optical axis Z1. The friction gear 82 is pressed against the rear support plate 80b by a spring washer 82a so that a predetermined magnitude of resistance is continuously exerted on the friction gear 82.

Figure 25:
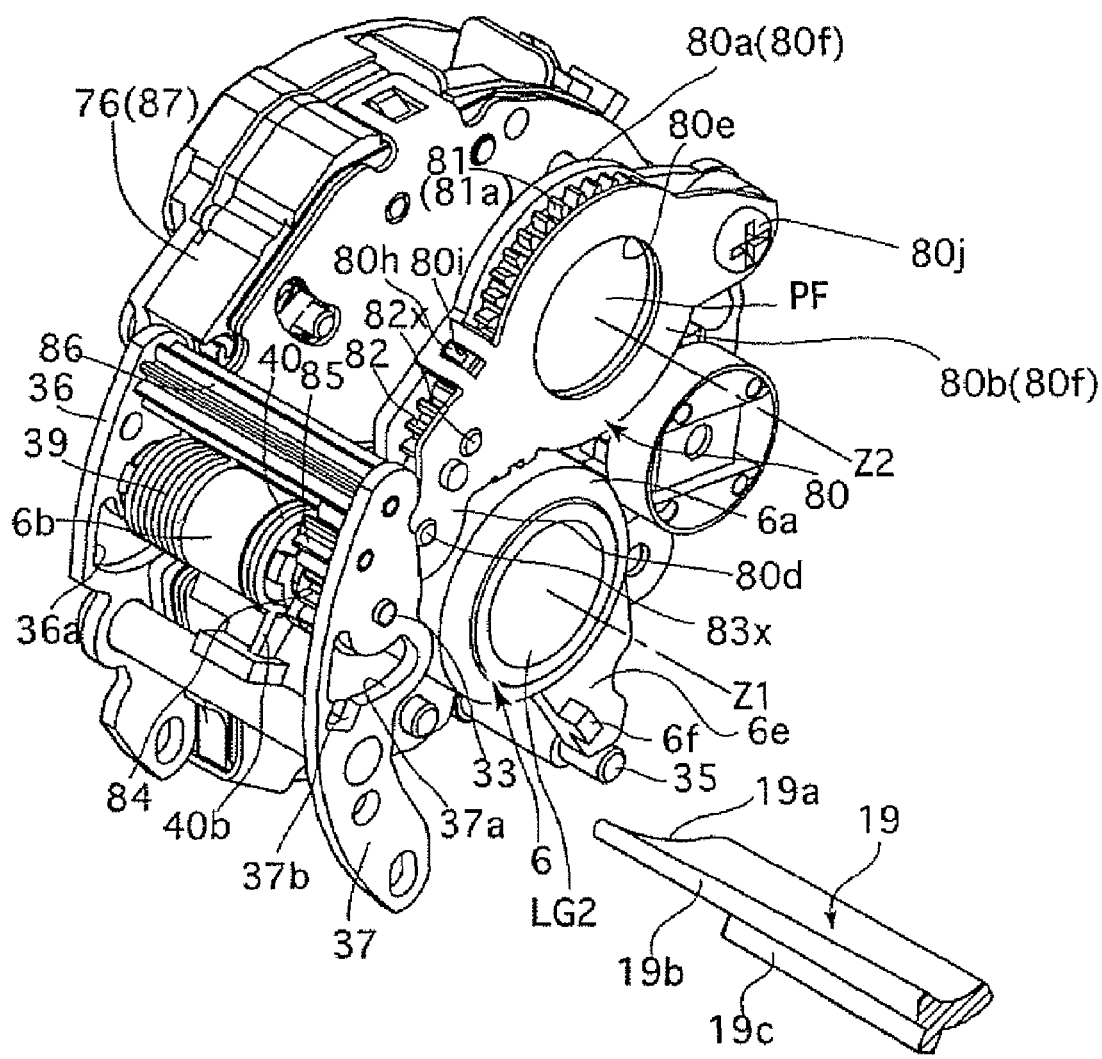
FIG. 25 is a perspective view of elements of the zoom lens shown in FIGS. 1 and 2 in a state where the zoom lens is in a ready-to-photograph state and where the polarizing filter is in a radially retracted position (off-axis position) thereof, viewed obliquely from the rear of the zoom lens.
Figure 26:
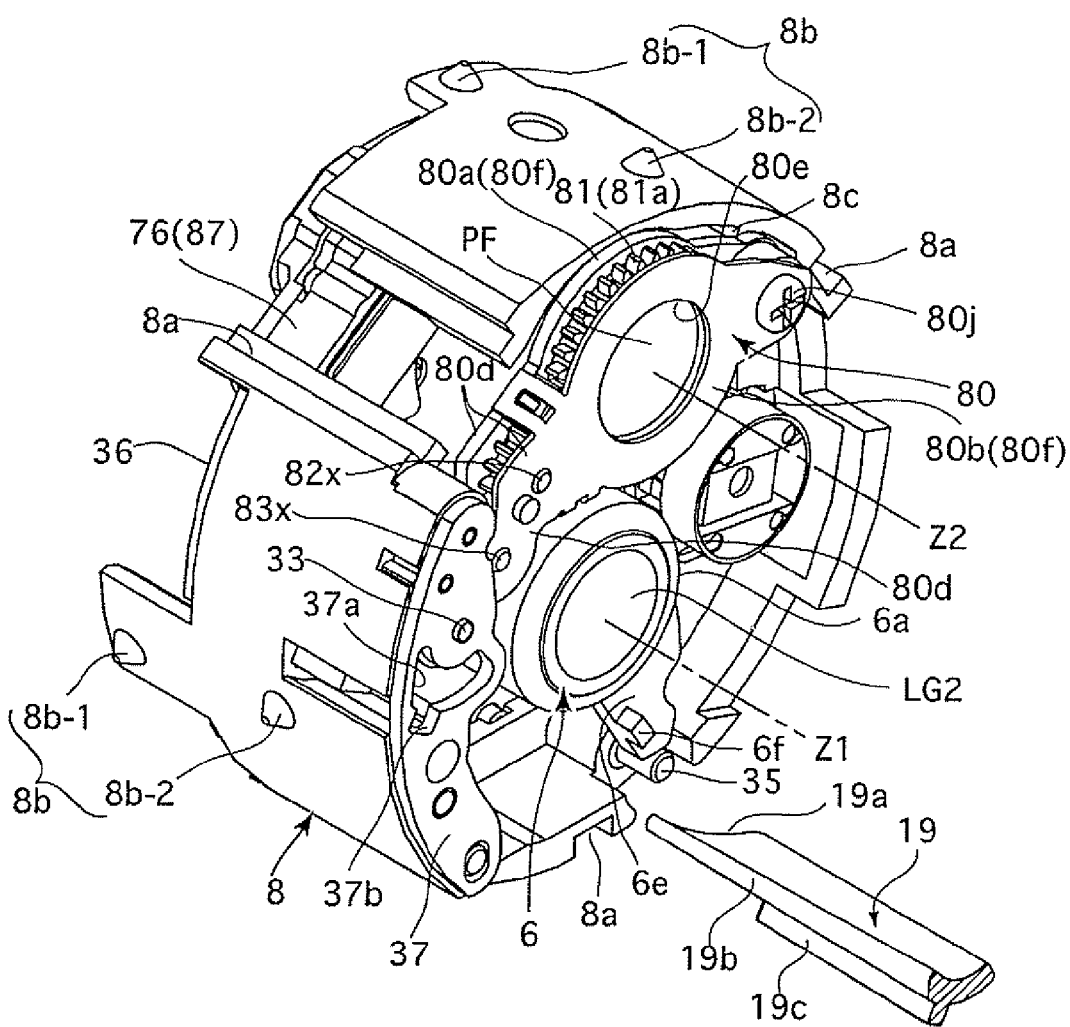
FIG. 26 is a view similar to that of FIG. 25, showing the elements shown in FIG. 25 in addition to the second lens group moving frame shown in FIGS. 10 and 21.
Figure 27:
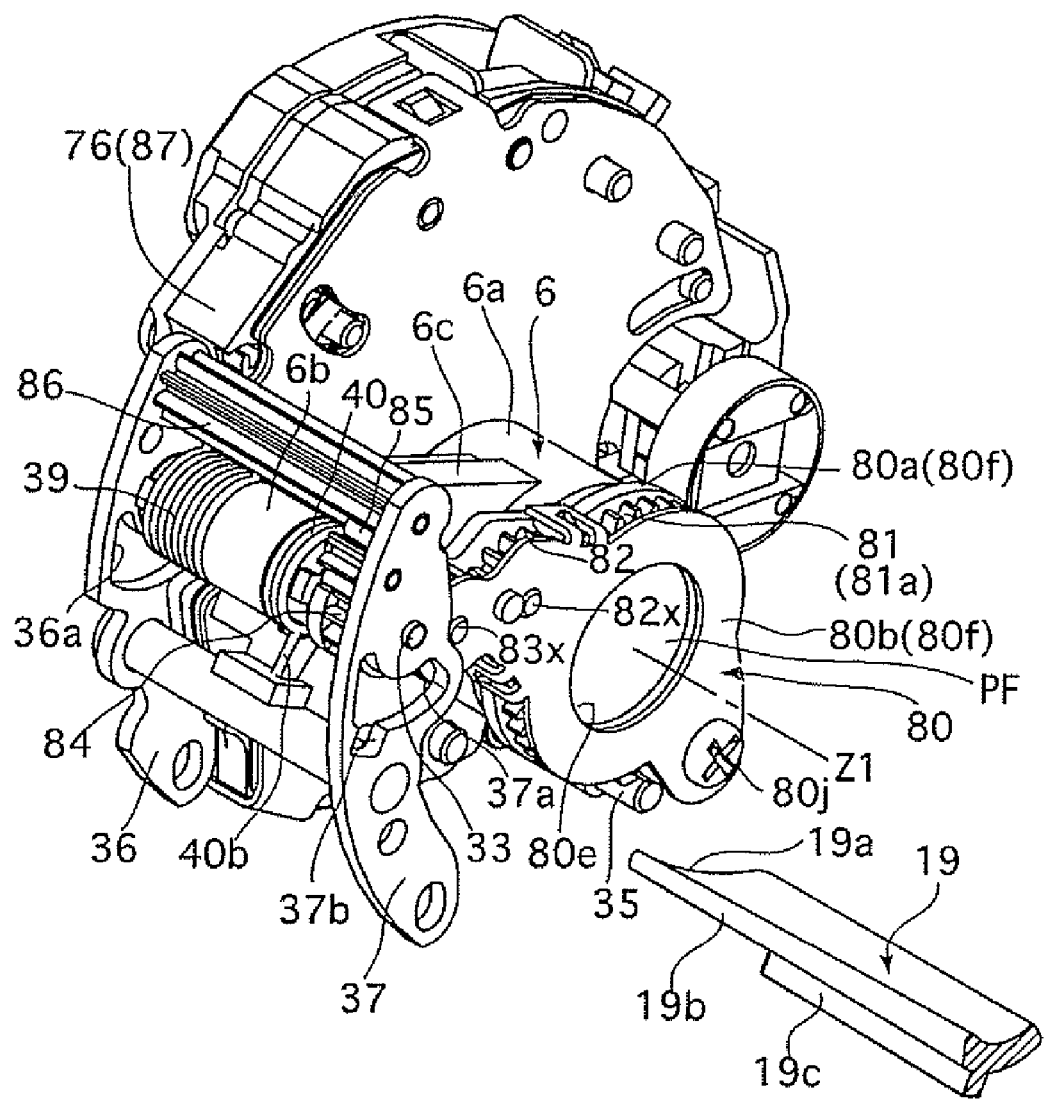
FIG. 27 is a view similar to that of FIG. 25, showing the elements shown in FIG. 25 in a state where the zoom lens is in a ready-to-photograph state and where the polarizing filter is in an inserted position (on-axis position) thereof, viewed obliquely from the rear of the zoom lens.

The drive gear 86 is driven forward and reverse by a filter drive motor 87 (see FIG. 22) mounted to the second lens group moving frame 8. The filter drive motor 87 together with actuators for driving the shutter S and the adjustable diaphragm A is provided in the shutter unit 76. As shown in FIGS. 25, 27 and 29, the shutter unit 76 and the insertable/ retractable filter holding frame 80 are apart from each other with the second lens group 6 being positioned between the shutter unit 76 and the insertable/retractable filter holding frame 80. The drive gear 86 is formed as a long gear which is elongated in the optical axis direction to be capable of transferring a driving force from the filter drive motor 87 on the shutter unit 76 to the idle gear 85 on the insertable/retractable filter holding frame 80 side. If the drive gear 86 is rotated, the rotation control gear 84 rotates via the idle gear 85. Since the friction gear 82 sustains a resistance by the spring washer 82a, the rotation control gear 84 and the idle gear 83 operate as a sun gear and a planet gear of a planetary gear train, respectively, so that the idle gear 83 revolves around the rotation control gear 84 thereon while rotating on the axis of the idle gear 83 when the rotation control gear 84 is rotated. This causes the insertable/retractable filter holding frame 80 to be rotated forward and reverse about the pivot shaft 33 in accordance with forward and reverse rotations of the drive gear 86, respectively. Consequently, similar to the second lens group LG2 that is held by the second lens frame 6, the polarizing filter PF can be moved between an inserted position (shown in FIGS. 27, 28, 31 and 33) in which the polarizing filter PF is positioned on the photographing optical axis Z1, and a radially retracted position (removed position; shown in FIGS. 25, 26, 29, 30, 32 and 34) in which the polarizing filter PF is positioned on the retracted optical axis Z2. Specifically, the polarizing filter PF moves on the photographing optical axis Z1 if the drive gear 86 rotates in a direction K1 shown in FIGS. 32 through 34, and the polarizing filter PF moves away from the photographing optical axis Z1 to move on the retracted optical axis Z2 if the drive gear 86 rotates in a direction K2 shown in FIGS. 32 through 34.

Figure 33:
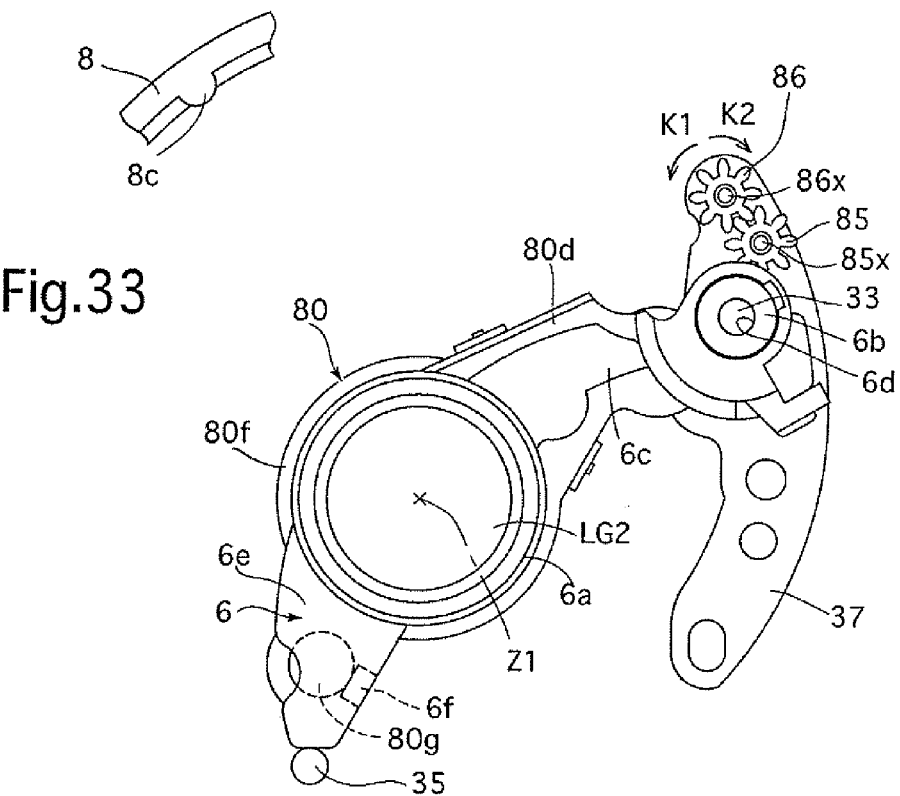
FIG. 33 is a front elevational view of a second lens frame, the insertable/retractable filter holding frame and other elements when both the second lens group and the polarizing filter are positioned on the photographing optical axis.
Figure 34:
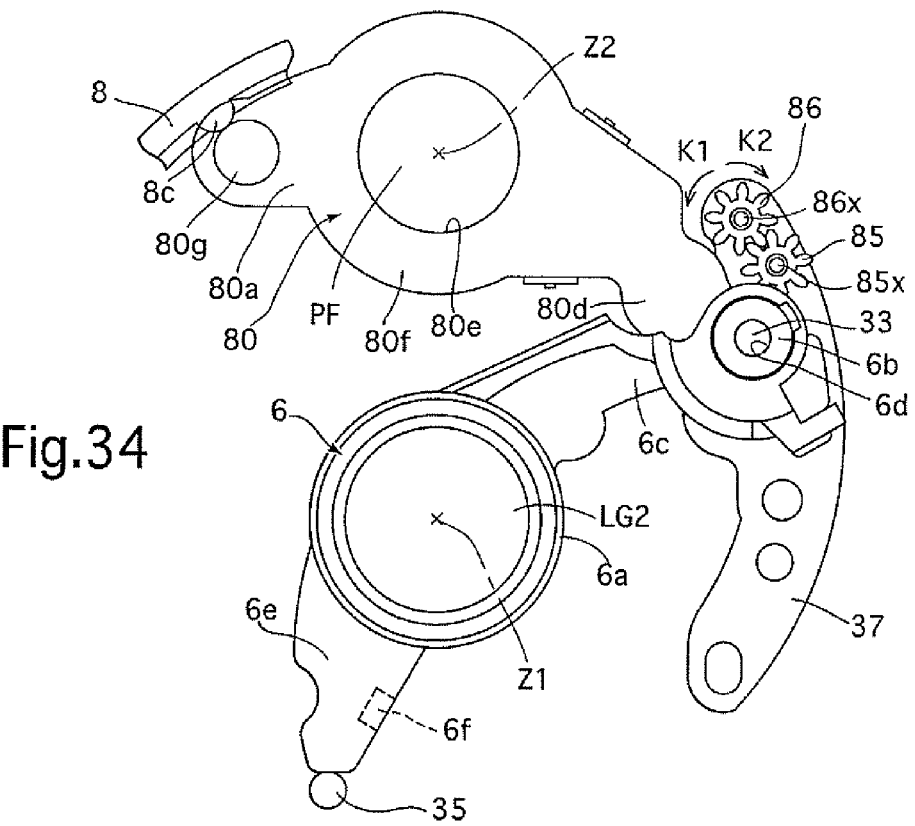
FIG. 34 is a front elevational view of the second lens frame, the insertable/retractable filter holding frame, and other elements, when the second lens group is positioned on the photographing optical axis while the polarizing filter is retracted to be positioned on a retracted optical axis positioned above the photographing optical axis.

Upon the insertable/retractable filter holding frame 80 being rotated to a point where the polarizing filter PF is in the inserted position, the stop portion 80g comes into contact with the stop projection 6f of the second lens frame 6 as shown in FIG. 33 to prevent the insertable/retractable filter holding frame 80 from further rotating in a filter inserting direction (counterclockwise as viewed in FIG. 33). Additionally, upon the insertable/retractable filter holding frame 80 being rotated to a point where the polarizing filter PF is in the radially retracted position, the stop portion 80g comes into contact with a stop protrusion 8c which protrudes from an inner peripheral surface of the second lens group moving frame 8 as shown in FIG. 34 to prevent the insertable/retractable filter holding frame 80 from further rotating in a filter removing direction (clockwise as viewed in FIG. 34).

According to the above described structure, in a ready-to-photograph state of the zoom lens 71 shown in FIG. 1, the inserting/removing operation of the polarizing filter PF (the forward/reverse rotation of the insertable/retractable filter holding frame 80) for bringing the polarizing filter PF to be positioned on or off the photographing optical axis Z1 can be freely carried out independently of the drive mechanism for zooming and focusing that drives the first, second and third lens groups LG1, LG2 and LG3. Specifically, FIGS. 25, 26 and 34 show a state where the polarizing filter PF is removed from the photographing optical axis Z1 in a ready-to-photograph state of the zoom lens 71, while FIGS. 27, 28 and 33 show a state where the polarizing filter PF is inserted to lie on the photographing optical axis Z1 in a ready-to-photograph state of the zoom lens 71. As can be understood from these drawings, the insertable/retractable filter holding frame 80 swings inside the second lens group moving frame 8, and accordingly, the polarizing filter PF can be inserted into and removed from a photographing optical path between the second lens group LG2 and the third lens group LG3 without interfering with operations of other optical elements such as the third lens group LG3 in the entire zooming range from the wide-angle extremity (shown by a lower half of the zoom lens 71 in FIG. 1) to the telephoto extremity (shown by an upper half of the zoom lens 71 in FIG. 1). In an inserted state of the polarizing filter PF, in which the axis of the polarizing filter PF lies on the photographing optical axis Z1, the polarizing filter PF is positioned immediately behind the second lens group LG2, so that a light bundle which emerges from the second lens group LG2 passes through the polarizing filter PF to be incident on the third lens group LG3. On the other hand, in a radially retracted state of the polarizing filter PF, in which the polarizing filter PF is retracted so that the axis thereof lies on the retracted optical axis Z2, the light bundle which emerges from the second lens group LG2 does not pass through the polarizing filter PF.

Figure 32:
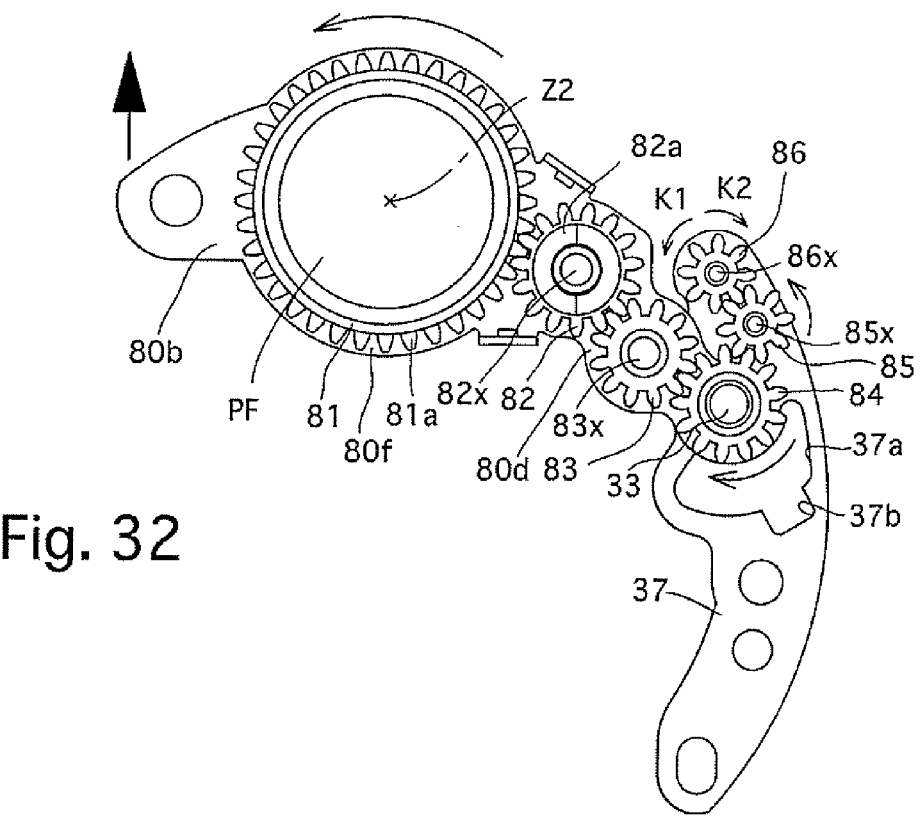
FIG. 32 is a front elevational view of the filter driving mechanism in a state where the polarizing filter is in the radially retracted position.

In the inserted state of the polarizing filter PF, the insertable/retractable filter holding frame 80 is prevented from rotating in the filter inserting direction by the engagement of the stop portion 80g with the stop projection 6f of the second lens frame 6 as described above (see FIG. 33). In this state where the insertable/retractable filter holding frame 80 is prevented from rotating in the filter inserting direction, further rotation of the drive gear 86 in a filter inserting direction (the aforementioned direction K1) causes the idle gear 83 and the friction gear 82 to rotate (on the axes thereof) in opposite directions shown by two broken-line arrows in FIG. 31, respectively, against the resistance exerted on the friction gear 82 by the spring washer 82a. Consequently, the filter holding ring 81 rotates clockwise as viewed in FIG. 31, and accordingly, the filter holding ring 81 can be rotated at a fixed position on the photographing optical axis Z1 relative to the insertable/retractable filter holding frame 80. Conversely, if the drive gear 86 is driven in a filter removing direction (the aforementioned direction K2) in the inserted state of the polarizing filter PF of FIGS. 31 and 33, the friction gear 82 does not rotate (on the axis thereof) but the idle gear 83 revolves around the rotation control gear 84 thereon while rotating on the axis of the idle gear 83, so that the insertable/retractable filter holding frame 80 is rotated about the pivot shaft 33 clockwise from the position in FIGS. 31 and 33. Consequently, the polarizing filter PF moves away from the photographing optical axis Z1 to move on the retracted optical axis Z2 as shown in FIGS. 32 and 34.

Figure 22:
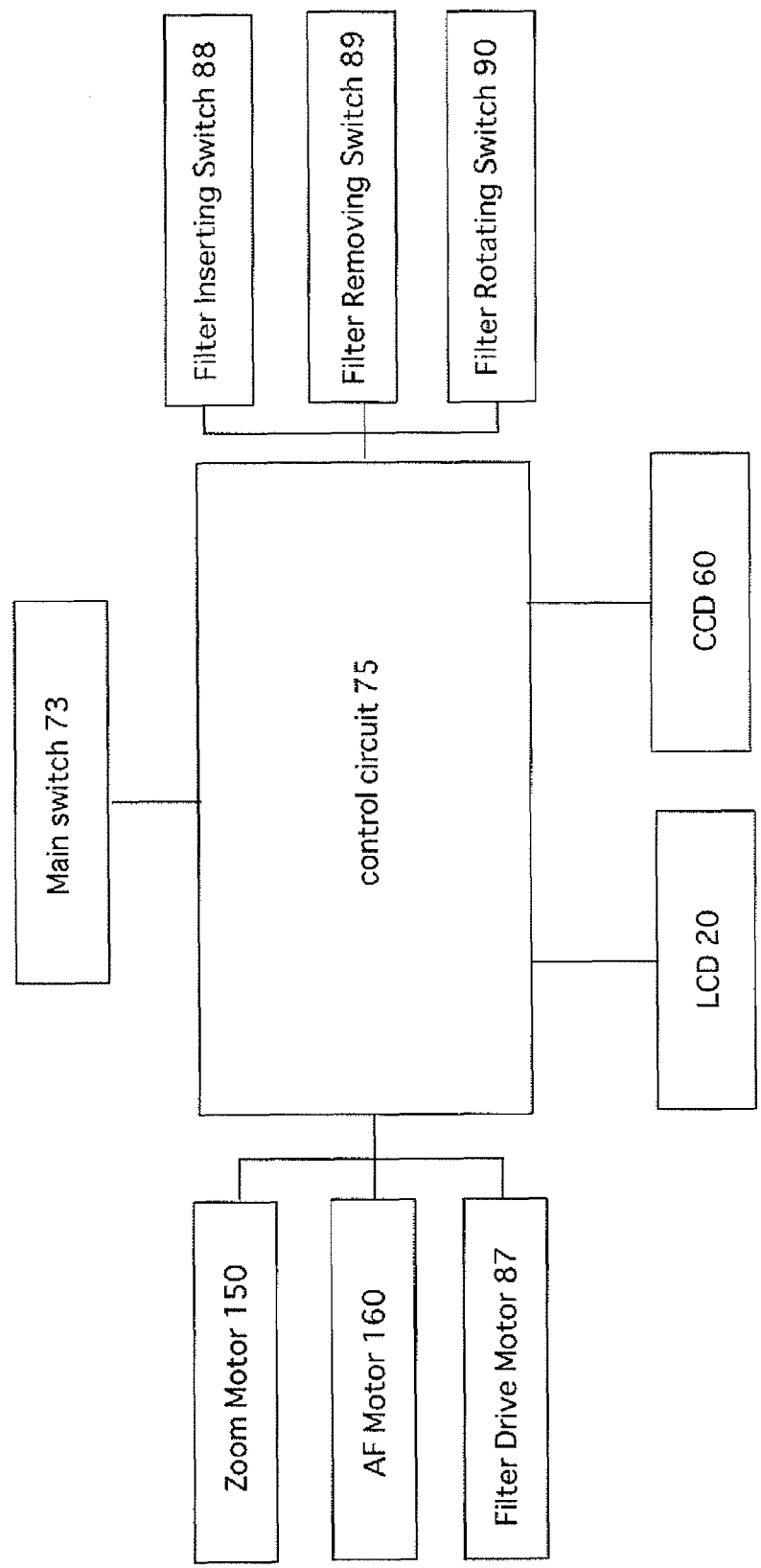
FIG. 22 is a block diagram of electrical components of the digital camera shown in FIGS. 1 and 2, showing connections among the electrical components.

The digital camera 70 is provided with the following three manual operation switches: a filter inserting switch 88, a filter removing switch 89 and a filter rotating switch 90 (see FIG. 22). The filter drive motor 87 is driven forward and reverse in accordance with operations of the filter inserting switch 88 and the filter removing switch 89, respectively. More specifically, the drive gear 86 is rotated in the aforementioned direction K1 by the filter drive motor 87 upon the filter inserting switch 88 being operated, and the drive gear 86 is rotated in the aforementioned direction K2 by the filter drive motor 87 upon the filter removing switch 89 being operated. The filter drive motor 87 is a pulse motor. Upon inputting an ON signal (insertion signal) via the filter inserting switch 88, the control circuit 75 controls the number of drive pulses for driving the filter drive motor 87 to rotate the insertable/retractable filter holding frame 80 from the aforementioned radially retracted position to the aforementioned inserted position. On the other hand, upon inputting an ON signal (remove signal) via the filter removing switch 89, the control circuit 75 controls the number of drive pulses for driving the filter drive motor 87 to rotate the insertable/retractable filter holding frame 80 from the aforementioned inserted position to the aforementioned radially retracted position.

Upon the filter rotating switch 90 being operated when the insertable/retractable filter holding frame 80 is in the inserted position, the drive gear 86 is rotated in the filter inserting direction (the aforementioned direction Ki) by the filter drive motor 87. Rotating the drive gear 86 in the filter inserting direction in a state where the insertable/retractable filter holding frame 80 is in the inserted state (positioned on the photographing optical axis Z1) causes the filter holding ring 81 to rotate on the photographing optical axis Z1. This rotation of the filter holding ring 81 changes the polarization effect produced by the polarizing filter PF, and accordingly, the user of the digital camera 70 can rotate the filter holding ring 81 to a point where an desired object image can be obtained while visually checking the object image indicated on the LCD panel 20.

Operations of the above described drive mechanism for driving the polarizing filter PF will be discussed hereinafter. When the digital camera 70 is in a ready-to-photograph state as shown in FIG. 1, the control circuit 75 controls the operation of the filter drive motor 87 so that the filter drive motor 87 rotates in the filter inserting direction to insert the polarizing filter PF (the insertable/retractable filter holding frame 80) into a photographing optical path between the second lens group LG2 and the third lens group LG3 on the photographing optical axis Z1 in accordance with an ON signal of the filter inserting switch 88, or controls the operation of the filter drive motor 87 so that the filter drive motor 87 rotates in a filter removing direction to move the polarizing filter PF (the insertable/retractable filter holding frame 80) out of the photographing optical path to thereby move the polarizing filter PF from the photographing optical axis Z1 onto the retracted optical axis Z2 in accordance with an ON signal of the filter removing switch 89. As described above, this filter inserting/removing operation can be carried out without interfering with operations of other optical elements in the entire zooming range of the zoom lens 71. Additionally, when the polarizing filter PF is in the inserted position (on the photographing optical axis Z1), the control circuit 75 controls the operation of the filter drive motor 87 so that the filter drive motor 87 rotates in the filter inserting direction to rotate the polarizing filter PF (the filter holding ring 81) in accordance with an ON signal of the filter rotating switch 90. Note that the control circuit 75 does not drive the filter drive motor 87 even if the filter rotating switch 90 is operated when the polarizing filter PF (the insertable/retractable filter holding frame 80) is in the radially retracted position (on the retracted optical axis Z2).

Upon inputting a switching signal for moving the digital camera 70 from a ready-to-photograph state shown in FIG. 1, in which the insertable/retractable filter holding frame 80 lies on the photographing optical axis Z1, to the fully-retracted state shown in FIG. 2, i.e., upon the main switch 73 of the digital camera 70 being turned OFF in a state where the filter inserting switch 88 is ON, the control circuit 75 drives the filter drive motor 87 in the filter removing direction to move the polarizing filter PF (the insertable/retractable filter holding frame 80) from the inserted position on the photographing optical axis Z1 to the radially retracted position on the retracted optical axis Z2. Subsequently, the control circuit 75 drives the zoom motor 150 in the lens barrel retracting direction to move the second lens group moving frame 8 rearward in the optical axis direction. Thereupon, the second lens frame 6 rotates to move from the photographing position (in which the second lens group LG2 is positioned on the photographing optical axis Z1) to the radially retracted position (in which the second lens group LG2 is positioned on the retracted optical axis Z2). In the case where the insertable/retractable filter holding frame 80 has been moved to the radially retracted position on the retracted optical axis Z2 when the main switch 73 is turned OFF, the control circuit 75 omits the operation for driving the filter drive motor 87 and performs a lens barrel retracting operation in which the zoom motor 150 is driven to fully retract the zoom lens 71 into the camera body 72 as shown in FIG. 2. FIGS. 29 and 30 show this state in which both the second lens frame 6 and the insertable/retractable filter holding frame 80 are removed from respective positions thereof on the photographing optical axis Z1. As can be understood from these drawings, the second lens group LG2 and the polarizing filter PF have been rotated in the same direction about the pivot shaft 33 to be thereby positioned adjacent to each other on the retracted optical axis Z2 in the forward/rearward direction. In this manner, by removing the second lens group LG2 and the polarizing filter PF in the same direction from respective positions on the photographing optical axis Z, the space for the second lens group LG2 and the polarizing filter PF to be radially retracted can be made smaller than the case where the second lens group LG2 and the polarizing filter PF are removed in different directions from respective positions on the photographing optical axis Z1. In addition, simplification of the support mechanism for supporting the second lens frame 6 and the insertable/retractable filter holding frame 80 is achieved by a reduction of the number of elements thereof because the second lens frame 6 and the insertable/retractable filter holding frame 80 are pivoted about a common pivot shaft, i.e., the pivot shaft 33.

The control circuit 75 continues to drive the zoom motor 150 in the lens barrel retracting direction even after the second lens frame 6 has rotated to the radially retracted position. This continuous driving of the zoom motor 150 causes the second lens group moving frame 8 to move rearward with the second lens frame 6 and the insertable/retractable filter holding frame 80 and to finally reach the position shown in FIG. 2. In the fully-retracted state of the zoom lens 71 shown in FIG. 2, the second lens group LG2 has been moved rearward to a position where the second lens group LG2 is positioned in an axial range substantially identical to an axial range in the optical axis direction in which the third lens group LG3 and the low-pass filter LG4 are positioned (i.e., so that the second lens group LG2 is positioned radially outside the third lens group LG3 and the low-pass filter LG4), and the polarizing filter PF has been moved rearward to a position where the polarizing filter PF is positioned in an axial range substantially identical to an axial range in the optical axis direction in which the CCD image sensor 60 is positioned (i.e., so that the polarizing filter PF is positioned radially outside the CCD image sensor 60). Accordingly, the length of the zoom lens 71 in the fully-retracted state thereof is reduced by a length substantially corresponding to the thickness of the second lens group LG2 and the polarizing filter PF, which makes it possible to reduce the thickness of the digital camera 70 in the optical axis direction, i.e., in the horizontal direction as viewed in FIG. 2. In the fully-retracted state of the zoom lens 71 shown in FIG. 2, the control circuit 75 does not drive the filter drive motor 87 even if any of the filter inserting switch 88, the filter removing switch 89 and the filter rotating switch 90 is operated.

Upon inputting a switching signal for moving the digital camera 70 from a ready-to-photograph state shown in FIG. 1 to the fully-retracted state shown in FIG. 2 in a state where the insertable/retractable filter holding frame 80 is positioned on the retracted optical axis Z2, the control circuit 75 drives the zoom motor 150 in the lens barrel retracting direction without driving the filter drive motor 87 in the direction to bring the polarizing filter PF to the radially retracted position because the polarizing filter PF has been already removed from a photographing optical path on the photographing optical axis Z1.

Contrary to the above described lens barrel retracting operation, upon inputting a switching signal for moving the digital camera 70 from the fully-retracted state shown in FIG. 2 to a ready-to-photograph state shown in FIG. 1, the control circuit 75 drives the zoom motor 150 in the lens barrel advancing direction to move the zoom lens 71 to the ready-to-photograph state at the wide-angle extremity as shown by a lower half portion of the zoom lens 71 in FIG. 1. During the course of this advancing movement of the zoom lens 71, the second lens frame 6 rotates about the pivot shaft 33 from the radially retracted position to the photographing position so that the second lens group LG2 is positioned on the photographing optical axis Z1. During this lens barrel advancing operation, the control circuit 75 does not drive the filter drive motor 87, and accordingly, the insertable/retractable filter holding frame 80 is moved forward in the optical axis direction together with the second lens group moving frame 8 while holding the polarizing filter PF in the radially retracted position on the retracted optical axis Z2.

When the zoom lens 71 moves from a ready-to-photograph state shown in FIG. 1 to the fully-retracted state shown in FIG. 2, the insertable/retractable filter holding frame 80 can be rotated in the filter removing direction by the rotation operation of the second lens frame 6 from the photographing position to the radially retracted position, not by the aforementioned driving force generated by the filter drive motor 87. Specifically, in a ready-to-photograph state of the zoom lens 71, the stop projection 6f of the second lens frame 6 is in contact with the stop portion 80g as shown in FIG. 33, and a rotation of the second lens frame 6 about the pivot shaft 33 from the photographing position to the radially retracted position (clockwise as viewed in FIG. 33) causes the stop projection 6f to press the stop portion 80g to rotate the insertable/retractable filter holding frame 80 to the radially retracted position together with the second lens frame 6. Due to this structure, even when the filter drive motor 87 is not properly driven accidentally because of some kind of control error, the polarizing filter PF and the insertable/retractable filter holding frame 80 are removed from a photographic optical path on the photographing optical axis Z1 to prevent the polarizing filter PF and the insertable/retractable filter holding frame 80 from interfering with such elements as the AF lens frame 51 and the CCD holder 21, which are positioned behind the polarizing filter PF and the insertable/retractable filter holding frame 80 in the optical axis direction, upon the main switch 73 being turned OFF, which makes a reliable lens barrel retracting operation possible. Namely, the zoom lens 71 is provided with a force removing device which makes it possible to force the filter holding frame 80 to rotate in a direction to move away from a photographing optical path on the photographing optical axis Z1 when the zoom lens 71 moves from a ready-to-photograph state to the fully-retracted state.

Unlike the above described embodiment of the zoom lens, it is possible for the zoom lens 71 to be provided with a device which detects a removed state (angular position of rotation) of the insertable/retractable filter holding frame 80 to bring the zoom motor 150 to a halt if an error occurs in the retracting operation of the polarizing filter PF by the filter drive motor 87 when the zoom lens 71 is retracted to the retracted position. This technique also makes it possible to prevent the polarizing filter PF and the insertable/retractable filter holding frame 80 from interfering with other elements such as the AF lens frame 51 and the CCD holder 21 upon the main switch 73 being turned OFF. However, providing with such a detecting device increases the production cost and may increase the size of the lens barrel, which is not desirable. Additionally, such a configuration cannot solve the basic problem of an incomplete rotation of the insertable/retractable filter holding frame 80 in the filter removing direction, although the detecting device can detect a malfunction in the rotation of the insertable/retractable filter holding frame 80 in the filter removing direction, and accordingly, the lens barrel retracting operation cannot be completed.

Conversely, according to the present embodiment of the zoom lens, even if a malfunction occurs in the drive mechanism using the filter drive motor 87, the insertable/retractable filter holding frame 80 can be reliably rotated to a position where the polarizing filter PF is in the radially retracted position to thereby make it possible to complete the lens barrel retracting operation by the zoom motor 150 by a simple structure in which the second lens frame 6 and the insertable/retractable filter holding frame 80 are provided with the stop projection 6f and the stop portion 80g, respectively.

Specifically, in the above described embodiment of the zoom lens, the stop projection 6f of the second lens frame 6 and the stop portion 80g of the insertable/retractable filter holding frame 80 constitute a device for forcing the polarizing filter PF to rotate (on its axis) on the photographing optical axis Z1 by receiving the driving force of the filter drive motor 87 in a direction to rotate the insertable/retractable filter holding frame 80 from the inserted position to the radially retracted position. Since the stop projection 6f and the stop portion 80g are also used as the forced removing device that forces the filter holding frame 80 to rotate in a direction to move away from a photographing optical path on the photographing optical axis Z1 when a malfunction occurs in the drive mechanism using the filter drive motor 87, though having an extremely simple structure. multiple functions are achieved by the stop projection 6f and the stop portion 80g.

Although the present invention has been discussed with reference to the specific embodiment described above, the present invention is not limited solely thereto; various changes can be made in this specific embodiment without departing from the scope of the invention claimed. For instance, although the polarizing filter PF is used as an example of an insertable optical element in the above illustrated embodiment, the present invention can be generally applied to a lens barrel including any other type of insertable optical element such as any type of optical filter other than a polarizing filter or a wide-angle converter lens. In this case, the insertable optical element does not have to be of a type which is driven to rotate on the photographing optical axis, like the polarizing filter PF of the above described embodiment of the zoom lens.

Although the number of elements of the zoom lens 71 is reduced to simplify the structure of the zoom lens 71 by the above described structure wherein the second lens frame 6 and the insertable/retractable filter holding frame 80 are pivoted about a common pivot, i.e., the pivot shaft 33 in the above described embodiment of the zoom lens, it is possible for a removable optical element holding frame which corresponds to the second lens frame 6 and an insertable optical element holding frame which corresponds to the insertable/retractable filter holding frame 80 to be pivoted about two separate pivot shafts, respectively.

Although each of the second lens frame 6 and the insertable/retractable filter holding frame 80 is pivoted about the pivot shaft 33 in the above described embodiment of the zoom lens, the optical element can be inserted into and removed from the photographing optical axis by not only rotating the optical element but also, e.g., moving the optical element linearly in a direction orthogonal to the photographing optical axis.

Although the present invention is suitably applied to a zoom lens such as the above illustrated embodiment of the zoom lens, the present invention can also be applied to a fixed-focal-length lens to obtain an effect similar to that obtained in the above illustrated embodiment of the zoom lens as long as the zoom lens is of a type which changes at least between a ready-to-photograph state and the retracted state.

It is indicated that all matter contained herein is illustrative and does not limit the scope of the present invention.

What is claimed is:

1. A lens barrel including a plurality of standard optical elements used in a standard photographing operation and at least one insertable optical element which is selectively inserted into and removed from a photographing optical path, a photographic effect being produced by said insertable optical element when said insertable optical element is positioned in said photographic optical path, said lens barrel comprising:

an accommodating driving device which moves said standard optical element and said insertable optical element rearward in an optical axis direction to change said lens barrel from a ready-to-photograph state to a retracted state;

an insertable-optical-element drive mechanism which moves said insertable optical element between an inserted position, in which said insertable optical element is positioned on said optical axis on which said standard optical element is positioned, and a removed position, in which said insertable optical element is positioned off said optical axis, in accordance with an insertion signal and a remove signal for said insertable optical element, respectively, in said ready-to-photograph state of said lens barrel;

a forced removing device which forces said insertable optical element to move from said inserted position to said removed position independently of said insertable-optical-element drive mechanism when said lens barrel moves from said ready-to-photograph state to said retracted state by said accommodating driving device; and a removable optical element holding frame which holds a removable part of said plurality of standard optical elements, wherein said removable optical element holding frame is movable in a plane orthogonal to said optical axis between a photographing position, in which said removable part of said plurality of standard optical elements is positioned on said optical axis, and a retracted position, in which said removable part of said plurality of standard optical elements is positioned off said optical axis;

a removing device which moves said removable optical element holding frame to said photographing position when said lens barrel is in said ready-to-photograph state, and moves said removable optical element holding frame to said retracted position when lens barrel moves from said ready-to-photograph state to said retracted state; and an insertable optical element holding frame which holds said insertable optical element and is movable in a plane orthogonal to said optical axis, wherein:

said forced removing device includes a holding-frame linkage portion comprising two contacting portions provided on one and the other of said removable optical element holding frame and said insertable optical element holding frame, and said one contacting portion applies a force to said other contacting portion in direction to move said insertable optical element from said inserted position to said removed position when said removable optical element holding frame moves from said photographing position to said retracted position.

2. The lens barrel according to claim 1, further comprising a removable-frame positioning device which determines a limit of movement of said removable optical element holding frame in a direction toward said photographing position thereof by making contact with said removable optical element holding frame when said lens barrel is in said ready-to-photograph state, wherein said contact of said two contacting portions with each other determines a limit of movement of said insertable optical element holding frame in an insertion direction toward said inserted position thereof.

3. The lens barrel according to claim 1, wherein, in a state where said removable optical element holding frame and said insertable optical element holding frame are positioned in said photographing position and said inserted position, respectively, with said two contacting portions being in contact with each other, said insertable-optical-element drive mechanism rotates said insertable optical element relative to said insertable optical element holding frame when said insertable-optical-element drive mechanism applies a further moving force to said insertable optical element holding frame in said insertion direction thereof.

4. The lens barrel according to claim 3, wherein said insertable optical element comprises a circular optical element which is supported by said insertable optical element holding frame to be rotatable on an axis of said circular optical element.

5. The lens barrel according to claim 1, further comprising a linearly movable frame which is guided linearly in said optical axis direction and moves rearward when said lens barrel moves from said ready-to-photograph state to said retracted state, wherein said removable optical element holding frame and said insertable optical element holding frame are supported by said linearly movable frame to be movable in said respective planes orthogonal to said optical axis.

6. The lens barrel according to claim 5, wherein said removable optical element holding frame and said insertable optical element holding frame are pivoted about a common shaft provided on said linearly movable frame.

7. The lens barrel according to claim 6, wherein said common shaft extends in said optical axis direction.

8. The lens barrel according to claim 1, wherein said insertable optical element comprises a polarizing filter.

9. The lens barrel according to claim 1, wherein said removable part of said plurality of standard optical elements comprises a lens element.

10. The lens barrel according to claim 1, wherein said removable optical element holding frame and said insertable optical element holding frame have substantially the same shape and size as viewed in said optical axis direction.

11. A lens barrel including a plurality of standard optical elements used in a standard photographing operation and at least one insertable optical element which is selectively inserted into and removed from a photographing optical path, a photographic effect being produced by said insertable optical element when said insertable optical element is positioned in said photographic optical path, said lens barrel comprising:

a removable optical element holding frame which holds a removable part of said plurality of standard optical elements, wherein said removable optical element holding frame is movable in a plane orthogonal to said optical axis between a photographing position, in which said removable part of said plurality of standard optical elements is positioned on said optical axis, and a retracted position, in which said removable part of said plurality of standard optical elements is positioned off said optical axis;

a removing device which moves said removable optical element holding frame to said photographing position when said lens barrel is in a ready-to-photograph state, and moves said removable optical element holding frame to said retracted position when lens barrel moves from said ready-to-photograph state to a retracted state;

an insertable optical element holding frame which holds said insertable optical element and is movable in a plane orthogonal to said optical axis;

an insertable-optical-element drive mechanism which moves said insertable optical element holding frame between an inserted position, in which said insertable optical element is positioned on said optical axis, and a removed position, in which said insertable optical element is positioned off said optical axis, in accordance with an insertion signal and a remove signal for said insertable optical element, respectively; and a linkage comprising two contacting portions provided on one and the other of said removable optical element holding frame and said insertable optical element holding frame, wherein:

said linkage links said insertable optical element holding frame with said removable optical element holding frame independently of said insertable-optical-element drive mechanism, and said one contacting portion applies a force to said other contacting portion to move said insertable optical element holding frame from said inserted position to said removed position thereof when said removable optical element holding frame moves from said photographing position to said removed position.

\* \* \* \* \*